United States Patent

Takahashi et al.

[11] Patent Number: 6,052,488
[45] Date of Patent: Apr. 18, 2000

[54] IMAGE CODING APPARATUS FOR CONVERTING IMAGE INFORMATION TO VARIABLE LENGTH CODES OF PREDETERMINED CODE SIZE, METHOD OF IMAGE CODING AND APPARATUS FOR STORING/TRANSMITTING IMAGE

[75] Inventors: Toshiyuki Takahashi; Narihiro Matoba, both of Kanagawa; Shinichiro Ohashi, Hyogo, all of Japan

[73] Assignee: Mitsubishi Denki Kabushiki Kaisha, Tokyo, Japan

[21] Appl. No.: 08/998,075

[22] Filed: Dec. 24, 1997

[30] Foreign Application Priority Data

Apr. 7, 1997 [JP] Japan .................................... 9-088126
Jul. 24, 1997 [JP] Japan .................................... 9-198506

[51] Int. Cl.[7] .............................. G06K 9/36; G06K 9/46
[52] U.S. Cl. ......................... 382/239; 382/233; 382/246; 382/248
[58] Field of Search .................................... 382/233, 234, 382/238, 246, 248, 239, 235

[56] References Cited

U.S. PATENT DOCUMENTS

| | | |
|---|---|---|
| 5,287,420 | 2/1994 | Barrett .................................... 382/233 |
| 5,307,177 | 4/1994 | Shibata et al. . |
| 5,414,527 | 5/1995 | Koshi et al. . |
| 5,621,465 | 4/1997 | Kondo . |
| 5,629,779 | 5/1997 | Jeon . |
| 5,859,932 | 1/1999 | Etoh ........................................ 382/233 |

FOREIGN PATENT DOCUMENTS

| | | |
|---|---|---|
| 4-000887A | 1/1992 | Japan . |
| 4-297184 | 10/1992 | Japan . |
| 05048914A | 2/1993 | Japan . |
| 05056282A | 3/1993 | Japan . |
| 5-161108 | 6/1993 | Japan . |
| 5-292487 | 11/1993 | Japan . |
| 6-152984 | 5/1994 | Japan . |
| 8-79762 | 3/1996 | Japan . |

OTHER PUBLICATIONS

"Image Coding Schemes for Hard Copiers". Kenichiro Oka et al., Bulletin of the Japanese Society of Printing Science and Technology, vol., 27, No., 3, 1990, pp. 290–297.

*Primary Examiner*—Phuoc Tran
*Attorney, Agent, or Firm*—McDermott, Will & Emery

[57] ABSTRACT

In an electronic still camera, a compression coefficient estimating unit performs preencoding using only an LA component of FBTC compressed data read from an image memory, and estimates an optimal compression ratio based on the result of preencoding. Thereafter, JPEG encoder performs JPEG compression on the image data applied from FBTC decoder with the estimated compression coefficient, and transfers the result to a recording apparatus. As compared with the prior art in which image data is directly preencoded, the time for preencoding can be significantly reduced and image memory requires smaller capacity.

19 Claims, 24 Drawing Sheets

ORIGINAL IMAGE

EXTRACT 4×4 BLOCK

| $X_{00}$ | $X_{01}$ | $X_{02}$ | $X_{03}$ |
|---|---|---|---|
| $X_{10}$ | $X_{11}$ | $X_{12}$ | $X_{13}$ |
| $X_{20}$ | $X_{21}$ | $X_{22}$ | $X_{23}$ |
| $X_{30}$ | $X_{31}$ | $X_{32}$ | $X_{33}$ |

↓ FBTC COMPRESSION

COMPRESSED DATA

| LA |
|---|

| LD |
|---|

| $\phi_{00}$ | $\phi_{01}$ | $\phi_{02}$ | $\phi_{03}$ |
|---|---|---|---|
| $\phi_{10}$ | $\phi_{11}$ | $\phi_{12}$ | $\phi_{13}$ |
| $\phi_{20}$ | $\phi_{21}$ | $\phi_{22}$ | $\phi_{23}$ |
| $\phi_{30}$ | $\phi_{31}$ | $\phi_{32}$ | $\phi_{33}$ |

FIG. 13

| INDEX TONE WIDTH INDEX LD | COMPRESSION COEFFICIENT | | | | | | | | |
|---|---|---|---|---|---|---|---|---|---|
| | 10 | 20 | 30 | 40 | 50 | 60 | 70 | 80 | 90 |
| 15.9 | 89236 | 57879 | 43941 | 31478 | 25765 | 21965 | 19294 | 16559 | 13490 |
| 25.7 | 112112 | 75472 | 58925 | 43423 | 35905 | 30755 | 27192 | 23363 | 18944 |
| 36.9 | 141456 | 98167 | 78116 | 58237 | 48222 | 41339 | 36508 | 31428 | 25460 |
| 46.2 | 160700 | 113014 | 90624 | 68107 | 56633 | 48756 | 43161 | 37197 | 30188 |
| 55.5 | 179943 | 127862 | 103133 | 77978 | 65045 | 56172 | 49814 | 42967 | 34916 |

PRIOR ART

FIG.25A
8×8 PIXEL BLOCK $$\begin{bmatrix} 159 & 153 & 158 & 152 & 140 & 138 & 132 & 132 \\ 164 & 162 & 162 & 157 & 151 & 142 & 134 & 132 \\ 167 & 168 & 161 & 160 & 158 & 145 & 139 & 134 \\ 164 & 168 & 161 & 166 & 162 & 152 & 149 & 141 \\ 171 & 166 & 168 & 167 & 163 & 162 & 157 & 151 \\ 173 & 164 & 169 & 170 & 166 & 166 & 162 & 161 \\ 175 & 169 & 172 & 176 & 172 & 174 & 174 & 166 \\ 173 & 172 & 175 & 173 & 180 & 181 & 177 & 172 \end{bmatrix}$$

↑ DCT

FIG.25B
DCT COEFFICIENT $$\begin{bmatrix} 260 & 49 & -16 & 5 & 2 & 4 & 0 & 1 \\ -79 & 36 & -2 & -7 & 1 & -3 & -1 & -2 \\ 0 & -8 & 3 & -2 & -2 & 1 & 5 & 1 \\ -8 & -4 & 5 & -4 & 1 & 7 & 6 & -2 \\ -2 & -6 & -1 & -1 & -4 & -1 & 0 & -1 \\ -3 & -2 & -1 & 1 & 1 & 2 & -5 & 0 \\ -4 & -1 & 1 & 1 & 0 & -2 & 2 & 0 \\ 1 & 1 & 1 & 1 & -1 & 1 & 1 & 0 \end{bmatrix}$$

↑ QUANTIZATION

FIG.25D
QUANTIZED DCT COEFFICIENT $$\begin{bmatrix} 16 & 4 & -2 & 0 & 0 & 0 & 0 & 0 \\ -7 & 3 & 0 & -1 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ -1 & 0 & 0 & 0 & 0 & 0 & 0 & 1 \end{bmatrix}$$

FIG.25C
QUANTIZATION TABLE $$\begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix} \times \text{COMPRESSION COEFFICIENT}$$

IMAGE CODING APPARATUS FOR CONVERTING IMAGE INFORMATION TO VARIABLE LENGTH CODES OF PREDETERMINED CODE SIZE, METHOD OF IMAGE CODING AND APPARATUS FOR STORING/TRANSMITTING IMAGE

BACKGROUND OF THE INVENTION

1. Field of the Invention

The present invention relates to an image coding apparatus, an image coding method and an apparatus for storing/transmitting image. More specifically, the present invention relates to an image coding apparatus for converting image information to variable length code of predetermined code size by compression, method of image coding and apparatus for storing/transmitting image.

2. Description of the Background Art

A variable length coding method proposed by JPEG (Joint Photographic Experts Group) has been known as a method of compressing image data. Though high compression ratio is possible by this method, the amount of codes after compression varies dependent on the content of the original image. Therefore, the amount of codes after compression is made constant in the following manner in such a field in that it is necessary to make constant the amount of codes after compression (for example, in the field of electronic still camera where a prescribed number of images must be picked up and recorded regardless of the content of the object).

FIG. 23 is a block diagram showing a structure of such a conventional electronic still camera. Referring to FIG. 23, the electronic still camera includes an image capture device 51, an image processing unit 52, an image memory 53, a JPEG encoder 54, code size measuring unit 55, compression coefficient estimating unit 56 and a recording device 57.

Image pickup device 51 includes a lens, a CCD and the like, and it converts an image of an object to an analog image signal. Image processing unit 52 performs various processes on analog image signal output from image capture device 51 and thereafter converts it to digital image data. Image memory 53 temporarily stores the digital image data generated by image processing unit 52.

JPEG encoder 54 includes a DCT unit 61, a quantization table storing unit 62, a multiplier 63, a quantizing unit 64 and a coding unit 65.

DCT unit 61 divides the original image into a plurality of pixel blocks each consisting of 8×8 pixels, and represents image data of each pixel block as a matrix consisting of pixel data of 8 rows×8 columns as shown in FIG. 25A, for example. Each pixel data represents image density of the corresponding pixel in 256 tones (8 bits=1 byte). DCT unit 61 performs two-dimensional DCT (Discrete Cosine Transformation) using equation (1) below on the matrix of each pixel block, providing a matrix expression of DCT coefficients in 8 rows×8 columns as shown in FIG. 25B.

$$F(u, v) = \frac{C(u)C(v)}{8} \sum_{x=0}^{7} \sum_{y=0}^{7} f(x, y) \cos\frac{(2x+1)u\pi}{16} \cos\frac{(2y+1)v\pi}{16} \quad (1)$$

(x, y, u, v: integer form 0 to 7)

In quantization table storing unit 62, a quantization table including threshold values of 8 rows and 8 columns as exemplified in FIG. 25C is stored. Multiplier 63 multiplies threshold value for quantization of 8 rows and 8 columns output from quantization table storing unit 62 by a certain coefficient (hereinafter referred to as compression coefficient).

Quantizing unit 65 divides the corresponding DCT coefficient by each threshold value of the quantization table applied from multiplier 63 as shown in FIG. 25D, and converts the result to a closest integer. Coding unit 65 encodes the quantized DCT coefficient block by block in accordance with Huffman coding method, and generates compressed data.

At this time, the larger the threshold for quantization, the narrower the bit width of the quantized value, which means that the amount of information is reduced and compression ratio is increased (the amount of codes after compression becomes smaller). However, the degree of degradation of image quality is higher. In contrast, the smaller the threshold value for quantization, the lower the compression ratio (the amount of codes after compression is larger), while the degree of degradation of image quality is suppressed. Utilizing this nature, it is possible to control relation between image quality and the amount of codes by storing basic quantization table in quantization table storing unit 62 and controlling threshold value for quantization by reorganizing the quantization table by multiplying compression coefficient.

Returning to FIG. 23, code size measuring unit 55 measures amount of data (amount of codes) of compressed data which have been converted to JPEG codes by JPEG encoder 54. Compression coefficient estimating unit 56 performs the following processings. In the first processing, a compression coefficient s1 is estimated by which amount of codes of the compressed data is made smaller than a predetermined target amount Qx of codes. In the second processing, contrary to the first processing, a compression coefficient s2 is estimated by which the amount of codes of the compressed data is made larger than the target code size Qx. In the third processing, an optimal compression ratio sx by which compressed data comes to have the target code size Qx is estimated, based on the result of measurement of code size when JPEG is performed using the aforementioned two compression coefficients s1 and s2.

As an example of the method of estimating compression coefficient sx, there is a method of estimating linearly as shown in FIG. 26. More specifically, code size after preencoding when compression coefficient is s1 is represented as Q1, code size after preencoding when compression coefficient is s2 is represented as Q2, and compression coefficient when the target code size Qx is attained is represented as xs. Assuming that the compression coefficient and the code size have linear relation, the coefficient sx can be calculated in accordance with the following equation.

$$sx = s1 - (s1-s2)(Qx-Q1)/(Q2-Q1) \quad (2)$$

Finally, the code data compressed to the target code size Qx is transferred to recording apparatus 57 and stored at a prescribed address of a recording medium.

FIG. 27 is a flow chart showing the operation of the electronic still camera in accordance with constant sized coding control using JPEG coding method. The operation of the electronic still camera shown in FIGS. 23 to 26 would be briefly described with respect to the flow chart.

An image of an object is converted to an analog image signal by image capture device 51, the analog image signal is converted to digital image data by image processing unit 52 and stored in image memory 53. The image data taken out from image memory 53 is applied to JPEG encoder 54.

In step S71, compression coefficient estimating unit 56 applies a relatively high compression ratio s1 to JPEG encoder 54 for preencoding operation 1 so that compression ratio is higher than the optimal value, or code size of the compressed data is smaller than target code size Qx, and code size measuring unit 55 measures code size Q1 of the compressed data.

Thereafter, in step S72, compression coefficient estimating unit 56 applies a relatively low compression ratio s2 to JPEG encoder 54 for preencoding operation 2, such that compression ratio becomes lower than the optimal value, or the code size of compressed data is larger than the target code size Qx, and code size measuring unit 55 measures the code size of the compressed data.

Thereafter, in step S73, compression coefficient estimating unit 56 estimates a compression coefficient by which optimal compression ratio is obtained, that is, by which the code size of the compressed data attains the target code size Qx, based on the result of two preencoding operations 1 and 2, applies the estimated compression coefficient sx to JPEG encoder 54 for encoding. The image data compressed to the target code size Qx is transferred to recording apparatus 57 and stored at a prescribed address of the recording medium.

However, in the conventional electronic still camera shown in FIGS. 23 to 27, JPEG compression must be performed a total of three times on the image data in order to compress the image data to the target code size Qx, which means that the necessary time is third times that required for one compression, and hence data compression takes much time.

FIG. 28 is a block diagram showing a structure of another conventional electronic still camera. Referring to FIG. 28, the electronic still camera differs from the one of FIG. 23 in that code size measuring unit 55 and compression coefficient estimating unit 56 are removed, while an edge intensity calculating unit 70 and compression coefficient estimating unit 71 are newly provided.

Edge intensity calculating unit 70 calculates a parameter E representing edge intensity, based on the image data read from image memory 53. The parameter E, the compression coefficient and the code size of the compressed data are correlated with each other. Compression coefficient estimating unit 71 estimates, based on the parameter E applied from edge intensity calculating unit 70 and on the aforementioned correlation, compression coefficient sx for compressing the image data to the target code size Qx. JPEG encoder 54 compresses image data read from image memory 53 with compression coefficient sx applied from compression coefficient estimating unit 71. The compressed data is transferred to recording apparatus 57. Such data compression method is disclosed, for example, in Japanese Patent Laying-Open No. 8-79762.

In this electronic still camera, compression coefficient sx is estimated without data compression, and JPEC compression is performed only once using the estimated compression coefficient sx. Therefore, as compared with the electronic still camera shown in FIG. 23 in which JPEG compression is performed three times, data compression takes shorter time.

However, in the electronic still camera shown in FIG. 28, image data generated by image capture device and image processing unit 52 is directly stored in image memory 53, so that image memory 53 must have large capacity, which leads to increased system cost.

SUMMARY OF THE INVENTION

Therefore, an object of the present invention is to provide method and apparatus for image coding and an apparatus for storing/transmitting image, by which image information can be compressed at high speed to variable length codes of a prescribed size with only a small capacity of image memory.

Briefly stated, in the present invention, image information is compressed to fixed length codes and stored in image memory, and an optimal compression ratio is estimated based on the fixed length codes taken out from the image memory. Therefore, compared with the prior art in which image information is stored as it is in the image memory and optimal compression ratio is estimated based on the image information taken out from the image memory, the image memory requires smaller capacity, and the optimal compression ratio can be estimated at high speed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 shows an example of a basic code size table stored in a basic code size table storing unit shown in FIG. 11.

FIGS. 25A to 25D are illustrations related to the operation of the JPEG encoder shown in FIG. 24.

DESCRIPTION OF THE PREFERRED EMBODIMENTS

[First Embodiment]

Figure 1:
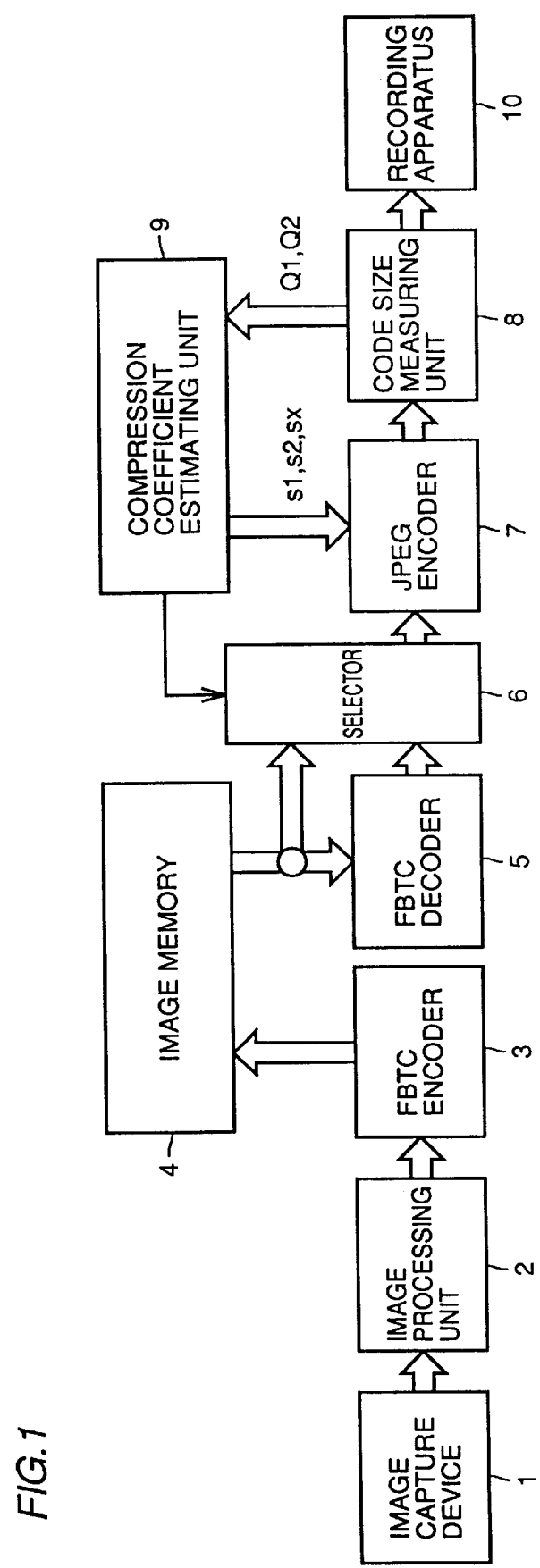
FIG. 1 is a block diagram showing a structure of an electronic still camera in accordance with one embodiment of the present invention.

FIG. 1 is a block diagram showing the structure of the electronic still camera in accordance with a first embodiment of the present invention. Referring to FIG. 1, the electronic still camera includes an image capture device 1, an image processing unit 2, an FBTC (Fixed Block Truncation Coding) encoder 3, an image memory 4, an FBTC decoder 5, a selector 6, a JPEG encoder 7, a code size measuring unit 8, a compression coefficient estimating unit 9 and a recording apparatus 10.

Image capture device 1 includes a lens, a CCD and the like, and converts an image of an object to an analog image signal. Image processing unit 2 performs various processings on the analog image signal output from image capture device 1 and converts it to digital image data.

FBTC encoder 3 compresses data size of the digital image data generated by image processing unit 2 to, for example, ½ in accordance with the FBTC method, which is a method of fixed length coding, and stores the compressed data to image memory 4.

Figures 2A, 2B, 2C:
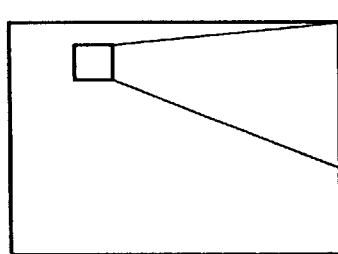
FIGS. 2A to 2C are illustrations related to the operation of an FBTC encoder shown in FIG. 1.
Figure 3:
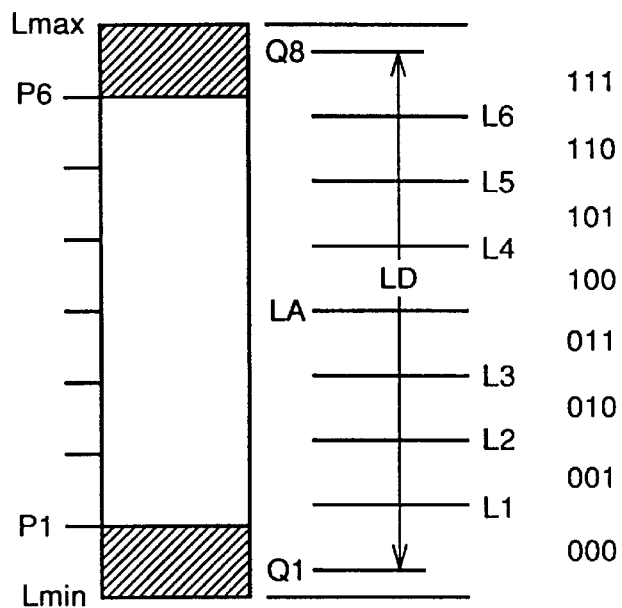
FIG. 3 is another illustration related to the operation of the FBTC encoder shown in FIG. 1.

The FBTC method will be described. The FBTC method used here refers to the method of coding of fixed length, based on GBTC (Generalized Block Truncation Coding) which is a method of block coding. This method has been proposed by Kenichiro Oka et al., "Image Coding Schemes for Hard Copiers" (Bulletin of The Japanese Society of Printing Science and Technology, Volume 27, No. 3, 1990, pp. 290–297), in section 2.5. Here, the method will be referred to as FBTC method, which is outlined below. In the FBTC method, referring to FIGS. 2A and 2B, an original image is divided into a plurality of pixel blocks each consisting of M×N (in the shown example, 4×4) pixels, and each pixel block is represented by a table consisting of pixel data $X_{ij}$ (i, j=0 to 3) of 4 rows and 4 columns. Each pixel data $X_{ij}$ represents, in 256 tones, image density of the corresponding pixel. Thereafter, referring to FIG. 3, the maximum value Lmax and the minimum value Lmin of the pixel data $X_{ij}$ in the block are extracted, and values P1 and P6 are calculated in accordance with the following equations (3) and (4).

$$P1 = (L\max + L\min * 7)/8 \tag{3}$$

$$P6 = (L\max * 7 + L\min)/8 \tag{4}$$

Thereafter, an average value Q1 of pixel data $X_{ij}$ which satisfies $X_{ij} < P1$, and an average value Q8 of pixel data $X_{ij}$ which satisfies $X_{ij} > P6$ are calculated, and an average value LA and tone width index LD are calculated in accordance with the equations (5) and (6).

$$LA = (Q1 + Q8)/2 \tag{5}$$

$$LD = Q8 - Q1 \tag{6}$$

Thereafter, based on the equations (7) to (12) below, six threshold values L1 to L6 are calculated. Using eight threshold values including Lmin, L1 to L6 and Lmax, pixel data $X_{ij}$ is converted to quantized value $\phi_{ij}$ of 3 bits.

$$L1 = LA - 3/8 * LD \tag{7}$$

$$L2 = LA - 2/8 * LD \tag{8}$$

$$L3 = LA - 1/8 * LD \tag{9}$$

$$L4 = LA + 1/8 * LD \tag{10}$$

$$L5 = LA + 2/8 * LD \tag{11}$$

$$L6 = LA + 3/8 * LD \tag{12}$$

Therefore, pixel data $X_{ij}$ of each block is compressed to quantized value $\phi_{ij}$ of 4 rows and 4 columns, average value LA of pixel data $X_{ij}$ in the block, and tone width index LD of pixel data $X_{ij}$ in the block. Each quantized value $\phi_{ij}$ is represented by 3 bits, and the average value LA and a tone width index LD are each represented by 8 bits. Accordingly, image data of each block which had 16 bytes is compressed to 3×16+8+8=64 bits=8 bytes.

When the FBTC coding method is applied as it is to an electronic still camera or the like, fixed length coding is realized. However, the number of images which can be stored is too small when the compression ratio is as mentioned above (½), and therefore such coding is not practical. Further, FBTC coding method is not a standard, and therefore it is not suitable for general use. One of the reasons why FBTC coding method is adopted here is that it allows reduction in capacity of the image memory while degradation in image quality is not much recognized.

Returning to FIG. 1, image memory 4 temporarily stores the FBTC compressed data generated by FBTC encoder 3. FBTC decoder decompresses the FBTC compressed data read from image memory 4, recovering the original image data, and applies the original data to selector 6. Selector 6 is controlled by compression coefficient estimating unit 9, and selectively applies to JPEG encoder 7 either the LA component contained in the FBTC compressed data from image memory 4 or image data from FBTC decoder 5.

Figure 23:
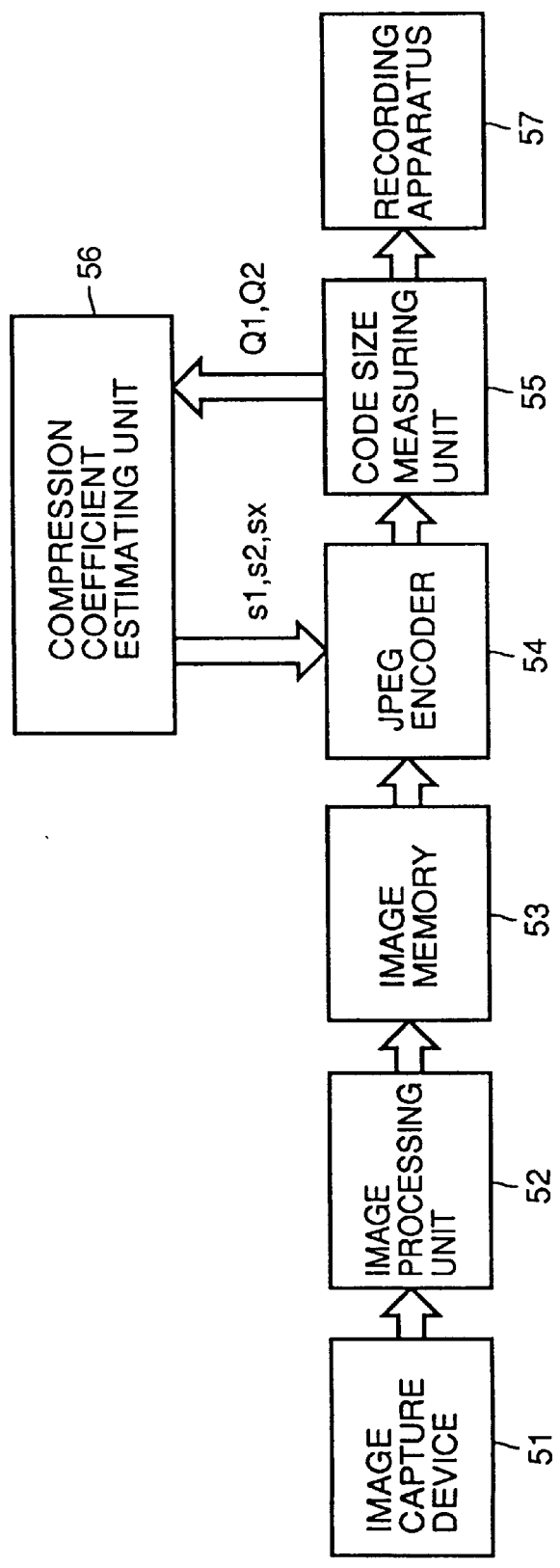
FIG. 23 is a block diagram showing a structure of a conventional electronic still camera.
Figure 24:
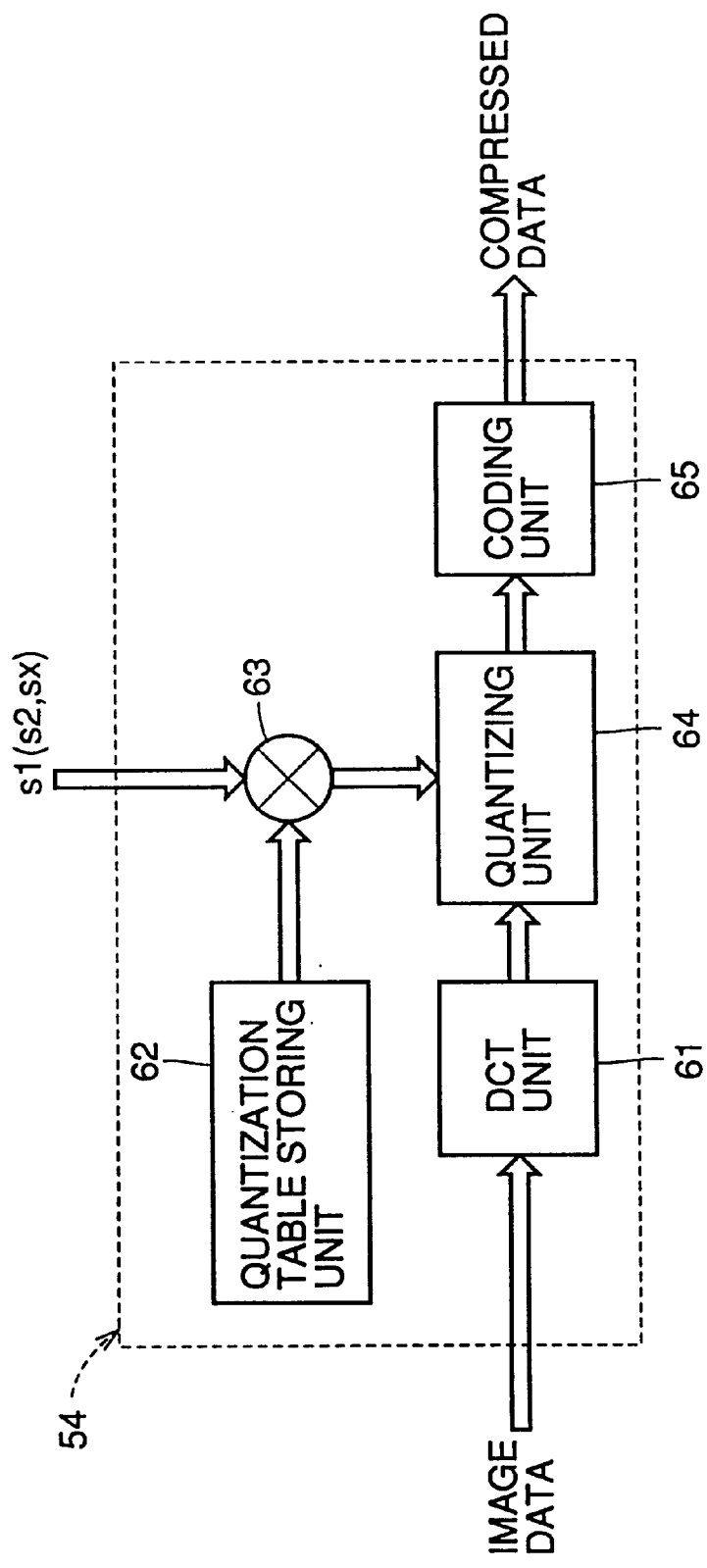
FIG. 24 is a block diagram showing a structure of a JPEG encoder shown in FIG. 23.

JPEG encoder 7 has the same structure as JPEG encoder 54 shown in FIGS. 23 and 24. Code size measuring unit 8 measures code size of the JPEG compressed data. Compression coefficient estimating unit 9 estimates the compression coefficient for compressing the image data to the target code size by controlling image memory 4, selector 6, JPEG encoder 7, code size measuring unit 8 and the like.

First, compression coefficient estimating unit 9 applies such a compression coefficient that makes smaller the code size of JPEG compressed data than the target code size to JPEG encoder 5 and controls selector 6 such that of the FBTC compressed data read from image memory 4, only the LA component is applied to JPEG encoder 7. JPEG encoder 7 multiplies the compression coefficient by the quantization table, and preencodes the LA component from selector 6 only. Code size measuring unit 8 measures the code size and applies it to compression coefficient estimating unit 9.

Thereafter, compression coefficient estimating unit 9 applies such a compression coefficient that makes the code size of JPEG compressed data larger than the target code size to JPEG encoder 7. JPEG encoder performs the second preencoding operation, code size measuring unit 8 measures the code size and applies it to compression coefficient estimating unit 9. Compression coefficient estimating unit 9 estimates such a compression coefficient that makes the code size of JPEG compressed data equal to the target code size, based on the code sizes of compressed data resulting from these two preencoding operations.

Figure 27:
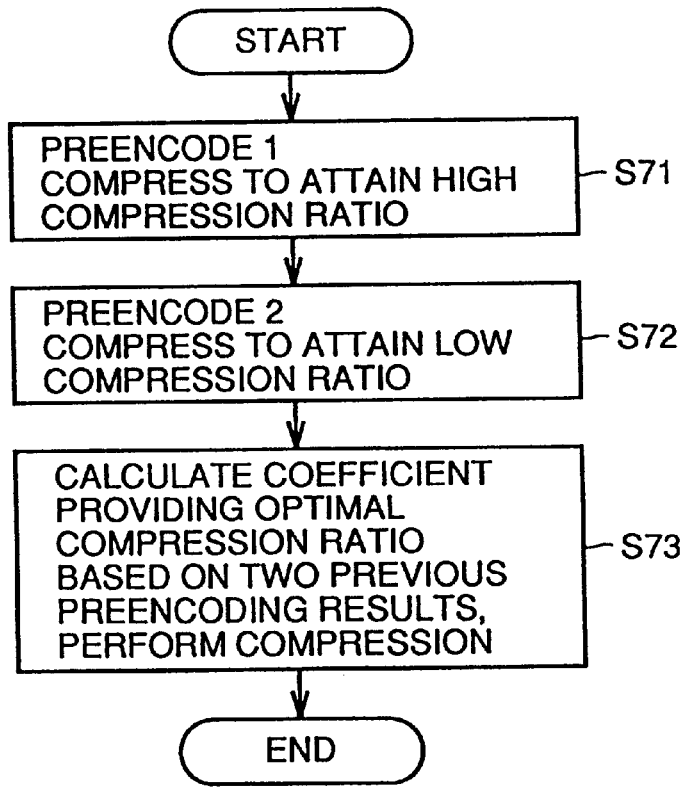
FIG. 27 is a flow chart showing the constant sized coding control method of the electronic still camera shown in FIG. 23.
Figure 28:
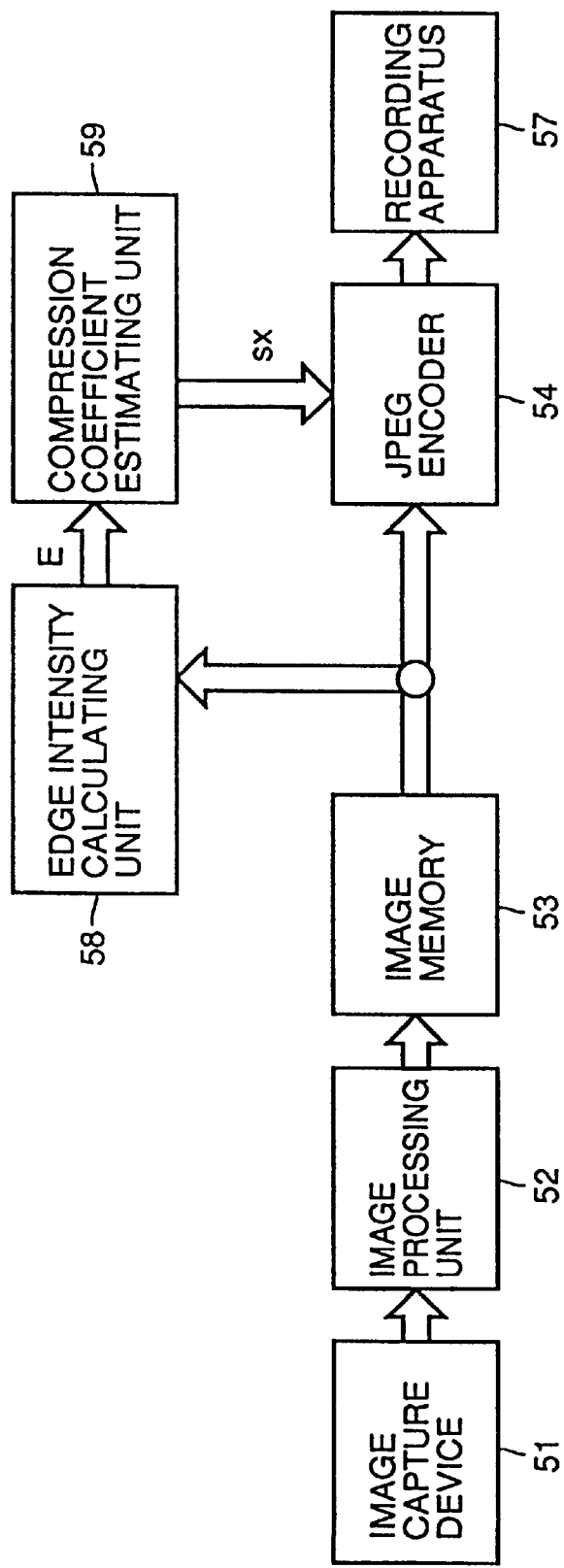
FIG. 28 is a block diagram showing a structure of another conventional electronic still camera.

The following method may be used to calculate the optimal value of the compression coefficient. The target code size is represented as Qx, compression coefficients for preencoding operations are represented as s1 and s2, and data sizes of LA components after compression using these coefficients are represented as Q1 and Q2. Since data size of the LA component is made $1/16$ of the original image, it is impossible to handle Qx, Q1 and Q2 at the same time. Therefore, a certain conversion coefficient k1 is defined which is multiplied by Q1 and Q2, whereby it becomes possible to handle three values, that is, Qx, k1Q1 and k1Q2 simultaneously. It is assumed that Qx, k1Q1, k1Q2, s1 and s2 have similar relation as shown in FIG. 27.

Assuming that k1Q1 corresponds to Q1 and k1Q2 corresponds to Q2, then compression coefficient sx for coding image data to the target code size Qx can be estimated in accordance with the following equation (13).

$$Sx = s1 - (s1-s2)(Qx-k1Q1)/(k1Q2-k1Q1) \quad (13)$$

Thereafter, compression coefficient estimating unit 9 applies the compression coefficient sx calculated in the above described manner to JPEG encoder 7, and controls selector 6 such that image data decoded by FBTC decoder 5 is applied to JPEG encoder 7. JPEG encoder 7 performs JPEG compression on image data applied from FBTC decoder 5 through selector 6, based on compression coefficient sx from compression coefficient estimating unit 9. The finally resulting JPEG compressed image data is transferred to recording apparatus 10 and stored at a prescribed address of the recording medium.

Figure 4:
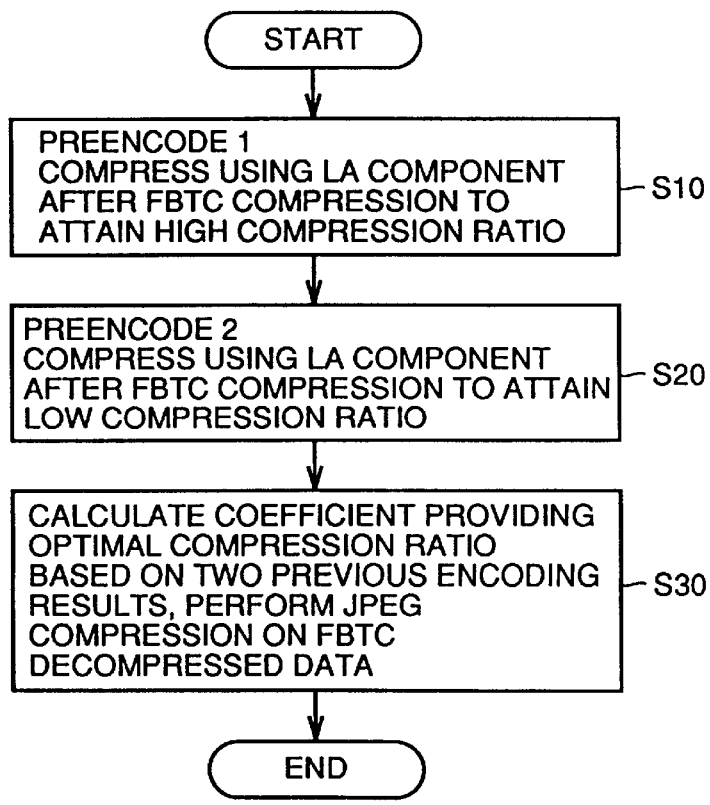
FIG. 4 is a flow chart showing a constant sized coding control method in the electronic still camera shown in FIG. 1.

FIG. 4 is a flow chart showing the operation of constant sized coding control method using JPEG coding method in the electronic still camera. The operation of the electronic still cameral shown in FIGS. 1 to 3 will be briefly described with reference to the flow chart.

An image of an object is converted to an analog image signal by image capture device 1, and converted to digital image data by image processing unit 2. The digital image data generated by image processing unit 2 is subjected to FBTC compression by FBTC encoder 3, and stored in image memory 4. In step S10, a relatively high compression ratio s1 is multiplied by quantization table so that the compression ratio becomes higher than optimal, or that the code size of JPEG compressed data is smaller than the target code size Qx, only the LA component read from image memory 4 is preencoded and code size of the preencoded data is measured. The code size of LA component is $1/16$ of the original image data. Therefore, as compared with the prior art in which image data has been preencoded as it is, the time necessary for preencoding can be reduced to $1/16$.

Thereafter, in step S20, a relatively low compression ratio s2 is multiplied by quantization table so that the compression ratio becomes lower than the optimal value, or that the code size of JPEG compressed data is larger than the target code size Qx, only the LA component read from image memory 4 is preencoded and code size of the preencoded data is measured.

Thereafter, in step S30, based on the results of two preencoding operations 1 and 2, the compression coefficient sx which makes the compression ratio optimal, that is, the compression coefficient by which code size of the JPEG compressed data becomes equal to the target code size Qx is estimated, which compression coefficient sx is multiplied by the quantization table and encoding is performed.

Finally, the data compressed to the target code size Qx is transferred to recording apparatus 10, and stored at a prescribed address of the recording medium.

In this embodiment,r only the LA component of FBTC compressed data is preencoded and the optimal value sx of the compression coefficient is calculated. Therefore, the image data can be compressed to a constant data size in a time period ($1/16 + 1/16 + 1$) times that of the normal JPEG compression. Therefore, compared with a prior art which required time period three times longer than common JPEG compression, the time for compression can be significantly reduced.

Further, the image data is first subjected to FBTC compression and stored in image memory, and optimal value sx of compression coefficient is calculated based on the LA component of the FBTC compressed data taken out from the image memory 4. Therefore, compared with the prior art in which image data has been stored as it is in the image memory and optimal value sx of the compression coefficient has been calculated based on the image data taken out form the image memory, the image memory requires smaller capacity.

In the present embodiment, preencoding operations 1 and 2 are performed by using LA component of FBTC compressed data by JPEG encoder 7. However, this is not limiting. For example, preencoding operations 1 and 2 may be performed by using LD component of FBTC compressed data to provide the same effect.

[Second Embodiment]

Generally, when the tone width index LD is large, pixel data Xij has wide variety. Therefore, when the image data is subjected to JPEG compression with the optimal compression ratio sx calculated by compressing only the LA component, the code size of the JPEG compressed data becomes larger than the target code size Qx. Therefore, in the second embodiment, the results of preencoding operations 1 and 2, that is, measured values Q1 and Q2 of the preencoded code sizes are corrected based on the tone width index LD.

Figure 5:
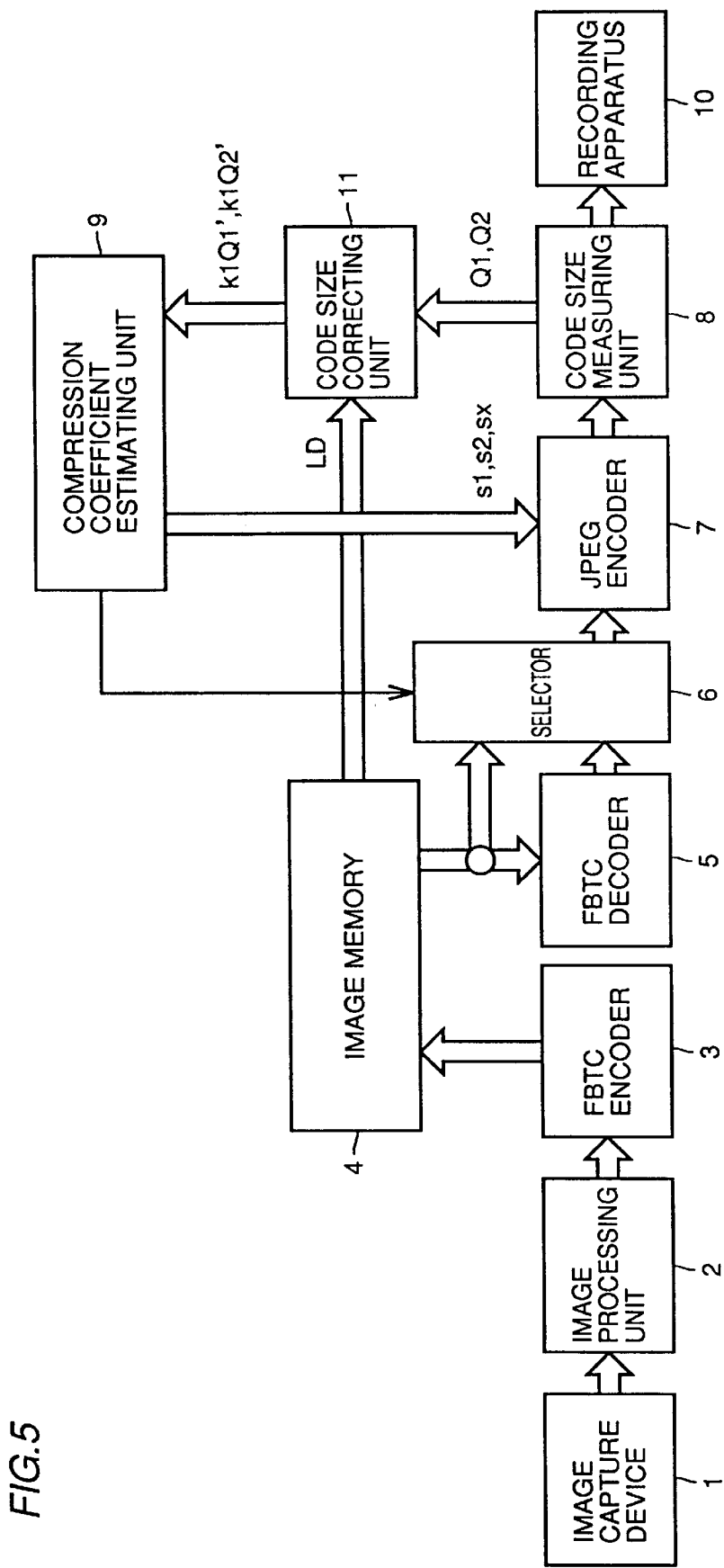
FIG. 5 is a block diagram showing a structure of an electronic still camera in accordance with a second embodiment of the present invention.

FIG. 5 is a block diagram showing the structure of the electronic still camera in accordance with the second embodiment of the present invention. Referring to FIG. 5, the electronic still camera differs from the electronic still camera of FIG. 1 in that a code size correcting unit 11 is newly provided.

Figure 6:
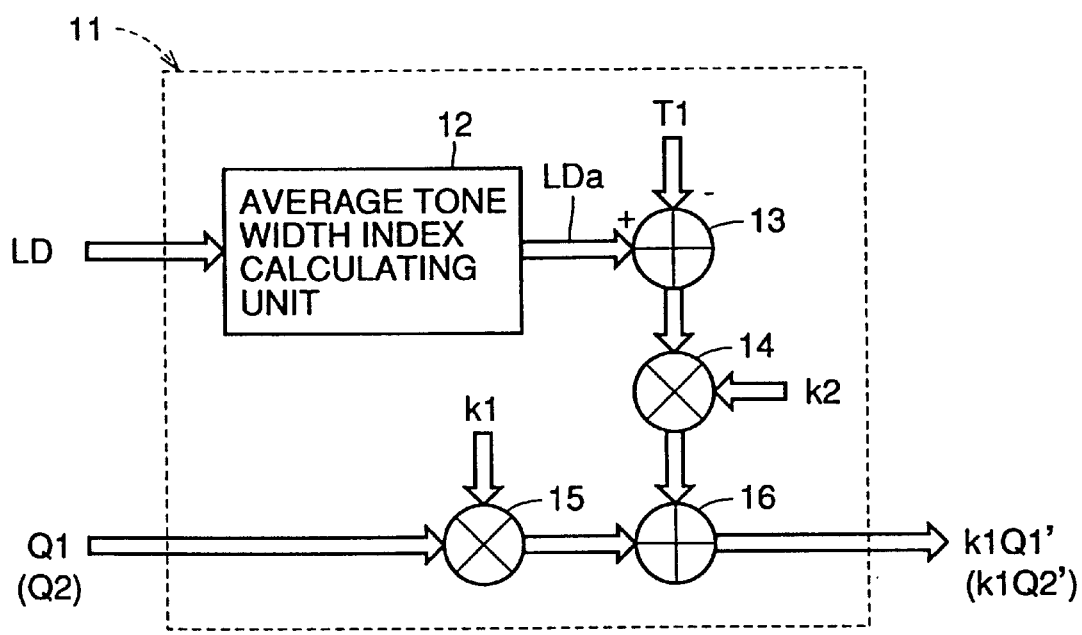
FIG. 6 is a block diagram showing a structure of a code size correcting unit shown in FIG. 5.

Code size correcting unit 11 includes, as shown in FIG. 6, an average tone width index calculating unit 12, a subtractor 13, multipliers 14 and 15, and an adder 16. Average tone width index calculating unit 12 calculates average value LDa of tone width index LD of all the blocks (or appropriately sampled blocks) of FBTC compressed data from image memory 4. Subtractor 13 subtracts a certain reference value T1 from LDa. Multiplier 14 multiplies LDa−T1 by an appropriate coefficient k2. Multiplier 15 multiplies code size Q1 from code size measuring unit 8 by a coefficient k1. Adder 16 adds k1Q1 to (LDa−T1)*k1. An output k1Q1' of adder 16 is applied to compression coefficient estimating unit 9. In other words, code size correcting unit 11 corrects the code size Q1 in accordance with the following equation (14).

$$K1Q1'=k1Q1+(LDa-T1)*k2 \tag{14}$$

This means the following. When LDa exceeds the reference value T1, a value corresponding to an absolute value of the difference is added to k1Q1, so as to effect upward correction of k1Q1. When LDa is below the reference value T1, a value corresponding to the absolute value of the difference is subtracted from k1Q1, so as to effect downward correction of k1Q1.

It is possible to perform delicate correction by preparing several different reference values T1 and corresponding different coefficients.

Code size Q2 from code size measuring unit 8 is also corrected in the similar manner as code size Q1. Compression coefficient estimating unit 9 uses k1Q1' and k1Q2' in place of k1Q1 and k1Q2 of equation (13).

Figure 7:
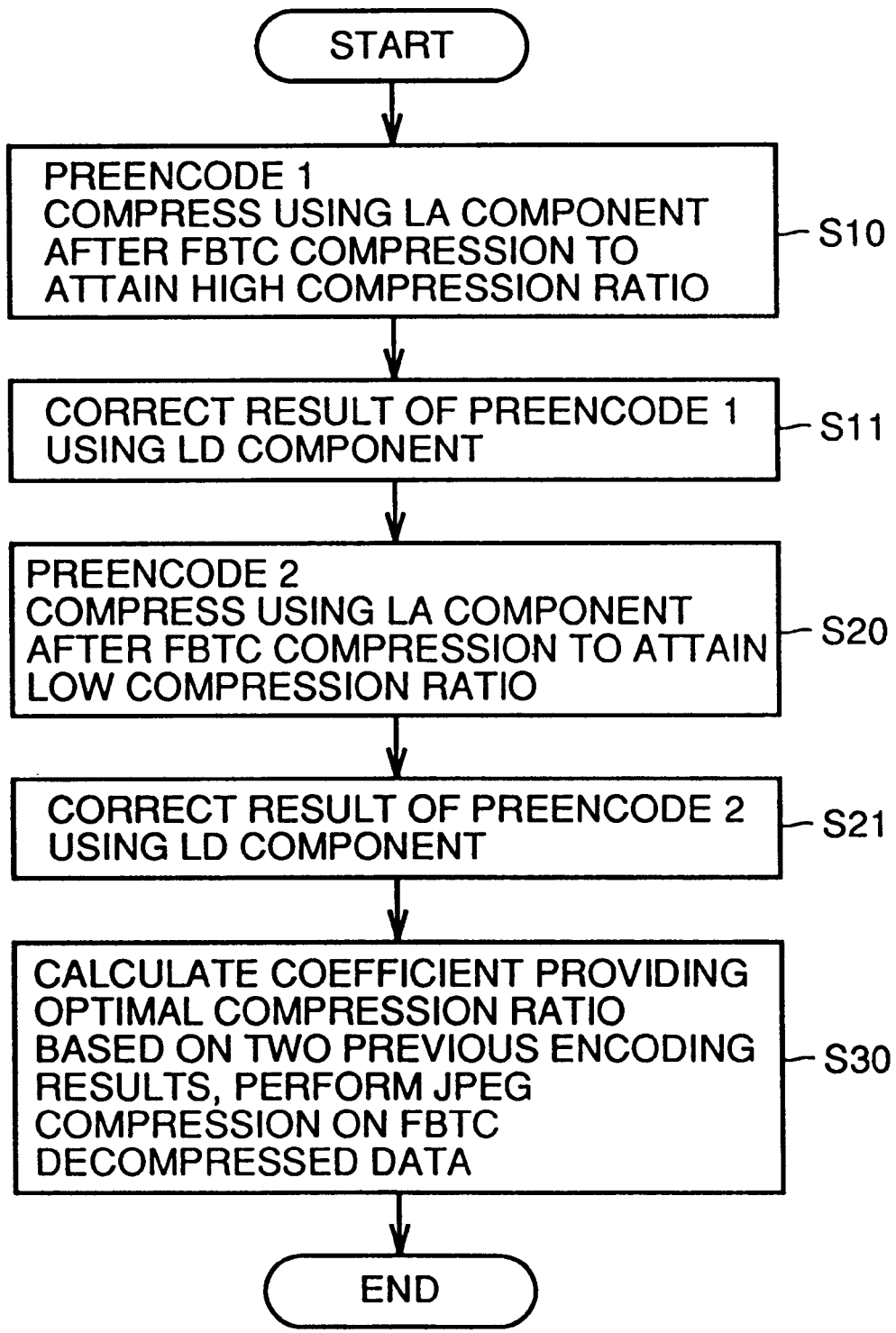
FIG. 7 is a flow chart showing constant sized coding control method in accordance with the electronic still camera shown in FIG. 5.

FIG. 7 is a flow chart showing the method of constant sized coding control method using the JPEG coding method in the electronic still camera of the present embodiment, corresponding to FIG. 4. Referring to FIG. 7, the constant sized coding control method differs from the constant sized coding control method of FIG. 4 in that it includes steps S11 and S21 newly provided. In steps S11 and S21, prior to steps S20 and S30, results of preencoding operations 1 and 2, that is, measured value Q1 and Q2 of the code sizes of the preencoded data are corrected based on the tone width index LD.

Except this point, the structure and operation are the same as those of the first embodiment, and therefore description thereof is not repeated.

In this embodiment, measured values Q1 and Q2 of the code sizes of the preencoded data are corrected based on the tone width index LD. Therefore, it becomes possible to make code size of the JPEG compressed data precisely match the target code size Qx.

When preencoding is performed using the LD component of FBTC compressed data, measured values Q1 and Q2 of the code sizes of the preencoded data may be corrected using LA component, instead of LD component.

[Third Embodiment]

Generally, when the quantization value $\phi_{ij}$ varies widely, the code size of the JPEG compressed data becomes larger than the target code size Qx when JPEG compression is performed with the coefficient calculated by compressing only the LA component. Therefore, in the present embodiment, results of preencoding operations 1 and 2, that is, measured values Q1 and Q2 of the code sizes of the preencoded data are corrected based on quantization value $\phi_{ij}$.

Figure 8:
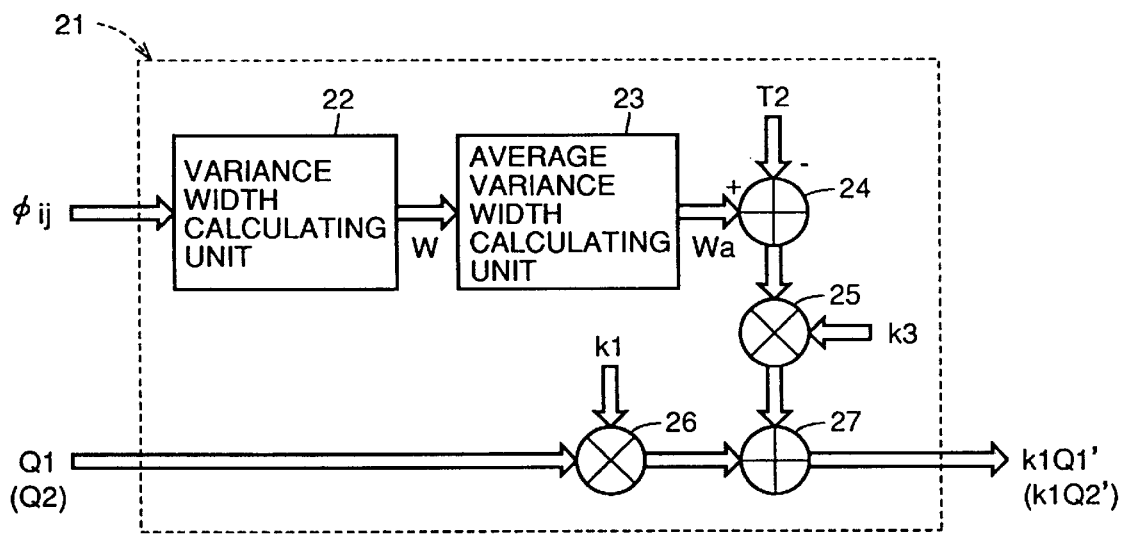
FIG. 8 is a block diagram showing the structure of the code size correcting unit of the electronic still camera in accordance with a third embodiment of the present invention.

FIG. 8 is a block diagram showing the structure of code size correcting unit 21 of the electronic still camera in accordance with the third embodiment of the present invention, which corresponds to FIG. 6. Referring to FIG. 8, the code size correcting unit 21 includes variance width calculating unit 22, average variance width calculating unit 23, a subtractor 24, multipliers 25 and 26, and an adder 27.

Variance width calculating unit 22 successively calculates width W of variance of quantization value $\phi_{ij}$ of each of all the blocks (or appropriately sampled blocks) of FBTC compressed data from image memory 4. At this time, the width W of variance of quantization value $\phi_{ij}$ is calculated in accordance with the following equations (15) to (17).

$$Wh = \sum_{i=0}^{3}\sum_{j=0}^{2}|\phi_{i,j}-\phi_{i,j+1}| \tag{15}$$

$$Wv = \sum_{j=0}^{3}\sum_{i=0}^{2}|\phi_{i,j}-\phi_{i+1,j}| \tag{16}$$

$$W=(Wh+Wv)/2 \tag{17}$$

More specifically, absolute values of differences between pixels adjacent along the horizontal direction (or vertical direction) in the block are added to each other, and the total sum is regarded as the width of variance. In equation (17), an average value of Wh and Wv is considered a general width W of variance. However, it may be possible to select larger one of Wh and Wv and use that value as the width W.

Average variance width calculating unit 23 calculates average value Wa of the width W of variance calculated by variance width calculating unit 22. Subtractor 24 subtracts a certain reference value T2 from Wa. Multiplier 25 multiplies Wa−T2 by an appropriate coefficient k3. Multiplier 26 multiples the code size Q1 from code size measuring unit 8 by the coefficient k1. Adder 27 adds k1Q1 to (Wa−T2)*k3. An output k1Q1' from adder 27 is applied to compression coefficient estimating unit 9. More specifically, code size correcting unit 21 corrects the code size Q1 in accordance with the following equation (18).

$$K1Q1'=k1Q1+(Wa-T2)*k3 \tag{18}$$

It is possible to perform more delicate correction by preparing several different reference values T2 and corresponding several coefficients k3.

The code size Q2 from code size measuring unit 8 is also corrected in the similar manner as code size Q1. Compression coefficient estimating unit 9 uses k1Q1' and k1Q2' in place of k1Q1 and k1Q2 of equation (13).

Figure 9:
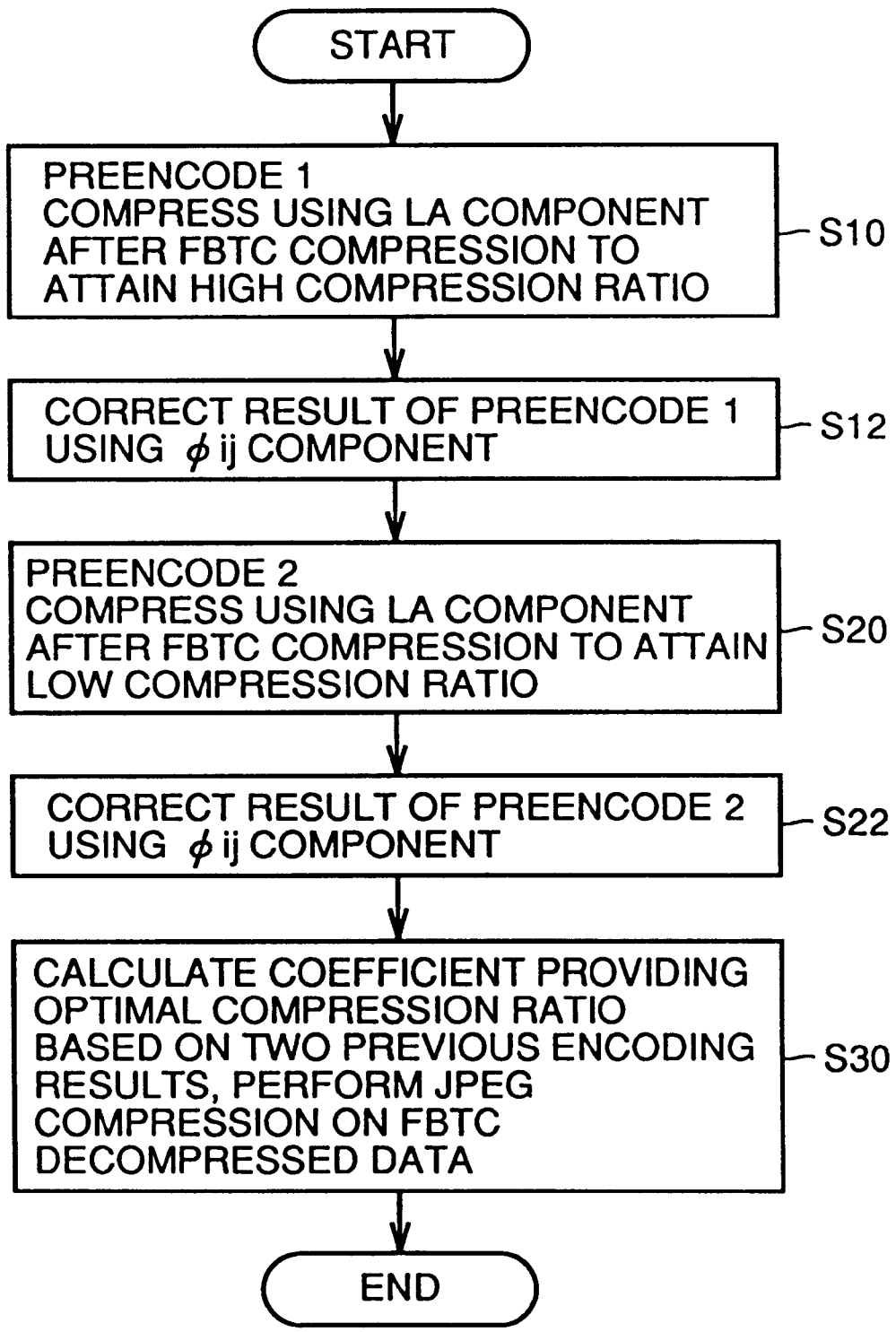
FIG. 9 is a flow chart showing the constant sized coding control method in the electronic still camera described with reference to FIG. 8.
Figure 10:
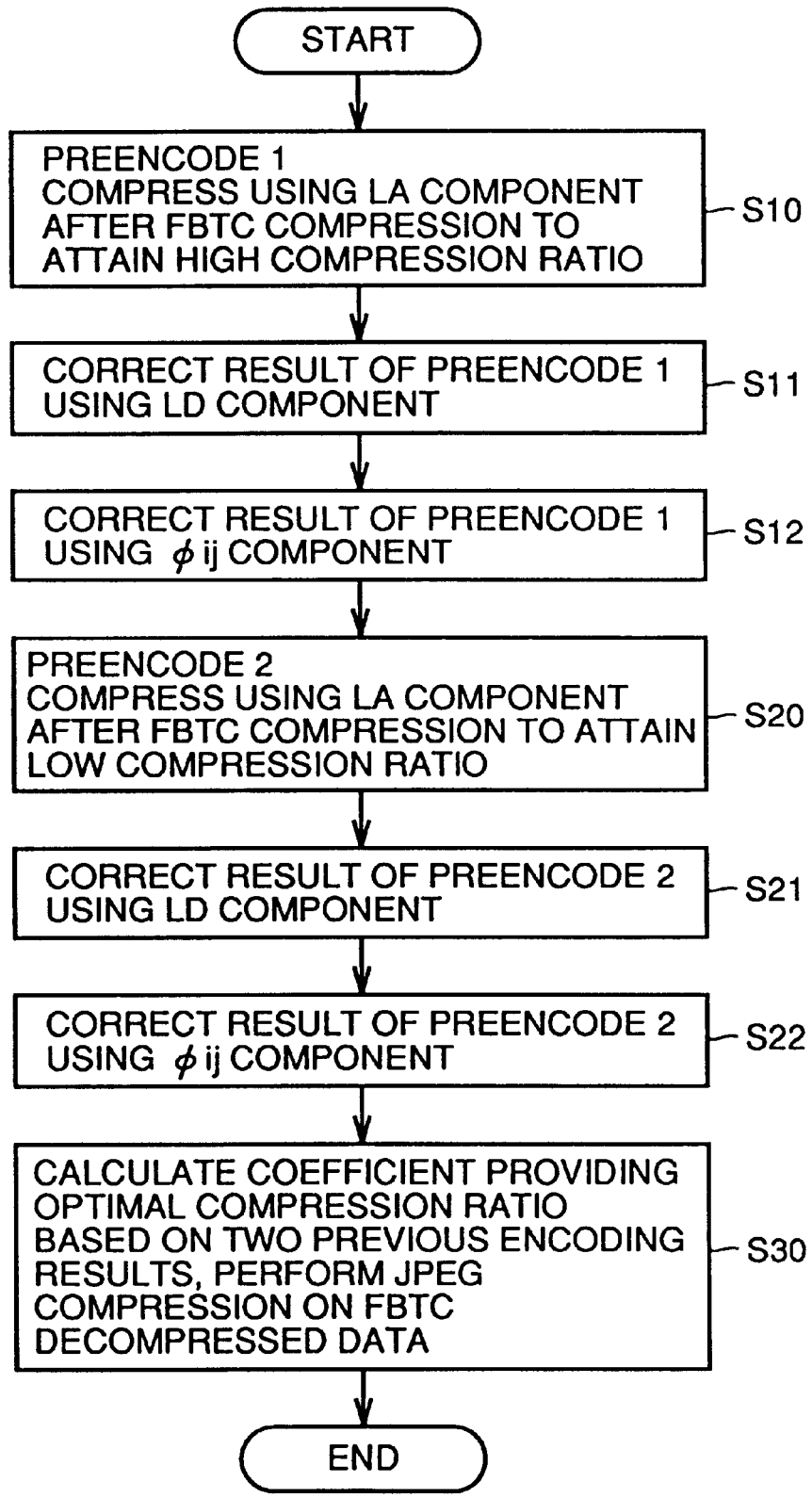
FIG. 10 is a flow chart showing an example of improvement of the constant sized coding control method shown in FIG. 9.

FIG. 9 is a flow chart showing the constant sized coding control method using the JPEG coding method in the electronic still camera, which corresponds to FIG. 7. Referring to FIG. 9, the constant sized coding control method differs from the constant code size correcting method of FIG. 7 in that steps S12 and S22 are included instead of steps S11 and S21. In steps S12 and S22, prior to steps S20 and S30, results of preencoding operations 1 and 2, that is, measured values Q1 and Q2 of the code sizes of the preencoded data are corrected based on the $\phi_{ij}$ component of the FBTC compressed data.

Except this point, the structure and operation are the same as those of the first embodiment, and therefore description thereof is not repeated.

In this embodiment, the measured value of the data amount of the preencoded data is corrected based on the quantization value $\phi_{ij}$. Therefore, it is possible to make code size of the JPEG compressed data precisely match the target code size Qx.

Even when preencoding is performed using LD component of the FBTC compressed data, same effect can be provided if the measured value of the code size of the preencoded data is corrected using quantization value $\phi_{ij}$.

Though measured values Q1 and Q2 of the code sizes of preencoded data are corrected using quantization value $\phi ij$, it goes without saying that the measured value of the JPEG compressed data may be corrected using both the tone width index LD (or average value LA) and quantization value $\phi ij$.

[Fourth Embodiment]

In the first to third embodiments, average value LA or tone width index LD is preencoded in accordance with the JPEG coding method, and optimal compression ratio is estimated based on the result. In the fourth embodiment, the compression coefficient is estimated faster, without performing preencoding at all.

Figure 11:
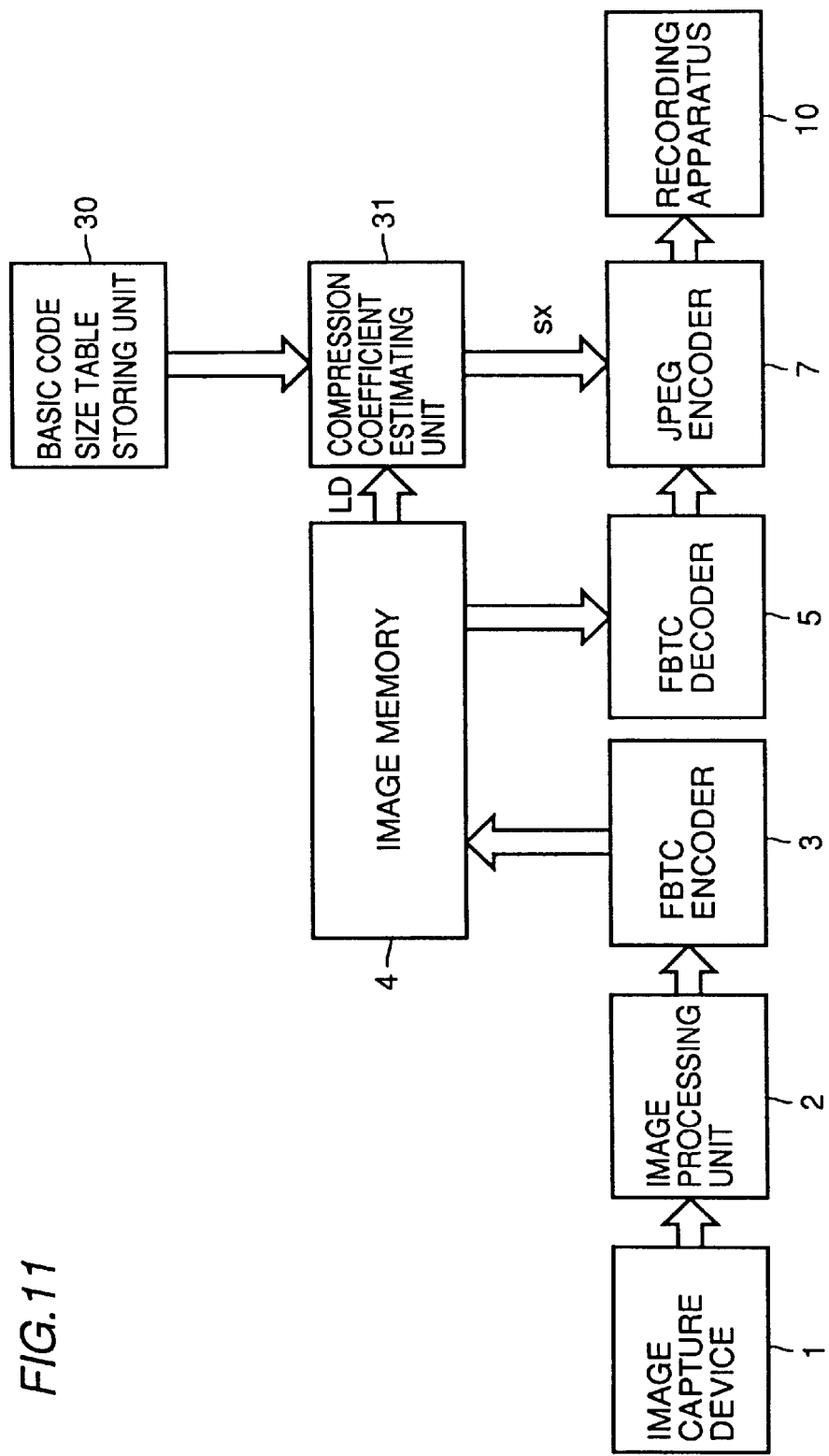
FIG. 11 is a block diagram showing a structure of an electronic still camera in accordance with a fourth embodiment of the present invention.

FIG. 11 is a block diagram showing the structure of the electronic still camera in accordance with the fourth embodiment of the present invention. Referring to FIG. 11, the electronic still camera differs from the electronic still camera of FIG. 1 in that selector 6, code size measuring unit 8 and compression coefficient estimating unit 9 are removed and that a basic code size table storing unit 30 and a compression coefficient estimating unit 31 are newly provided.

Basic code size table storing unit 30 stores in the form of a table data, relation between compression coefficients and code sizes. Compression coefficient estimating unit 31 estimates, based on the basic code size table stored in basic code size table storing unit 31 and on tone width index LD which is FBTC coded data, the compression coefficient sx for compressing the image data to the target code size Qx.

The operation of the electronic still camera will be described. The image data read by a CCD, for example, is subjected to various signal processings as already described in first to third embodiment above, converted to digital data, and input first to FBTC encoder 3. Compressed data which has been subjected to FBTC coding process by FBTC encoder 3 is temporarily stored in image memory 4.

Prior to description of basic code size table 30 and compression coefficient estimating unit 31, the code size and image quality of JPEG coding will be briefly described. As already described, in the JPEG coding method, DCT converted data is quantized, using quantization table.

Here, the larger the threshold value for quantization, the smaller the number of bits representing the quantization value. Therefore compression ratio is raised and code size decreased. However, the image quality is more degraded. In contrast, the smaller the threshold value for quantization, the lower the compression ratio, while image quality is less degraded.

Utilizing such nature, it is possible to control relation between image quality and code size by storing a basic quantization table such as shown in FIG. 25C in quantization table storing unit 62 and reorganizing the quantization table by multiplying compression coefficient, as already described with respect to the back ground art.

Figure 12:
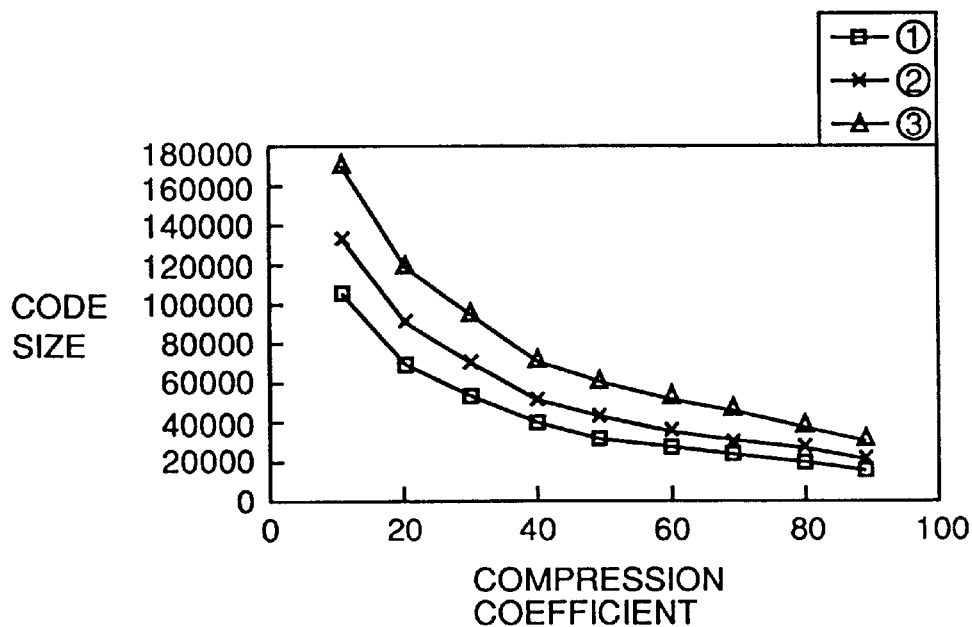
FIG. 12 is a graph showing principle of the constant sized coding control method of the electronic still camera shown in FIG. 11.

Typical relation between the compression coefficient and the code size is shown in FIG. 12. As can be seen from the figure, the larger the compression coefficient, the smaller the code size (the higher the compression ratio).

When a common natural image is subjected to JPEG coding, the curve generally goes down to the right as shown in FIG. 12 in almost all images. Difference among images is only the vertical shift of the amounts as represented by the curves ①, ② and ③. Considering the fact that the larger the high frequency component of an image, the larger the code size after JPEG coding, it is understood that the example ③ contains largest high frequency component in FIG. 12.

Figure 26:
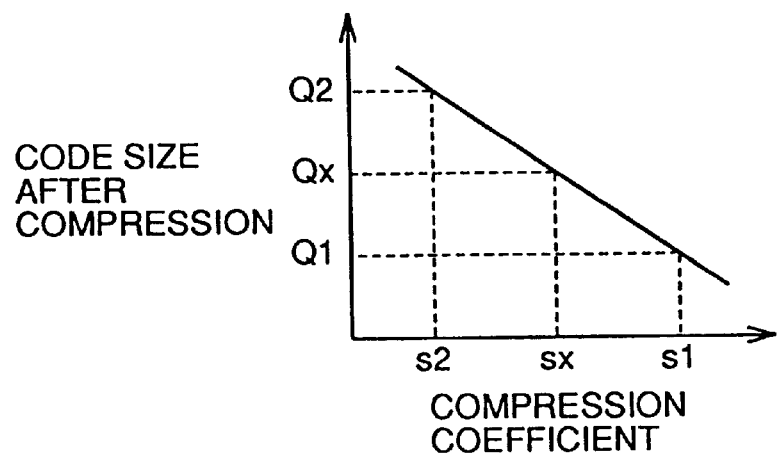
FIG. 26 is a graph related to the operation of the compression coefficient estimating unit shown in FIG. 23.

Further, the larger the high frequency component, the wider the variance of pixel data. Accordingly, tone width index LD at the time of FBTC coding also comes to have a high value. In other words, the larger the tone width index LD, the larger the code size. Therefore, when tone width index LD of an image to be processed is known, it is possible to estimate the relation between the compression coefficient and the code size such as shown in FIG. 12. If this relation is estimated, it becomes possible to estimate the compression coefficient for the target code size as shown in FIG. 26, and hence it becomes possible to control the code size such that it is kept constant.

The actual method of control will be described in the following. First, five typical relations between compression coefficient and code size (referred to as basic code size table) are found, as shown in FIG. 13, and stored in basic code size table storing unit 30, for example.

Tone width index LD is allotted as an index to each relation.

Figure 14:
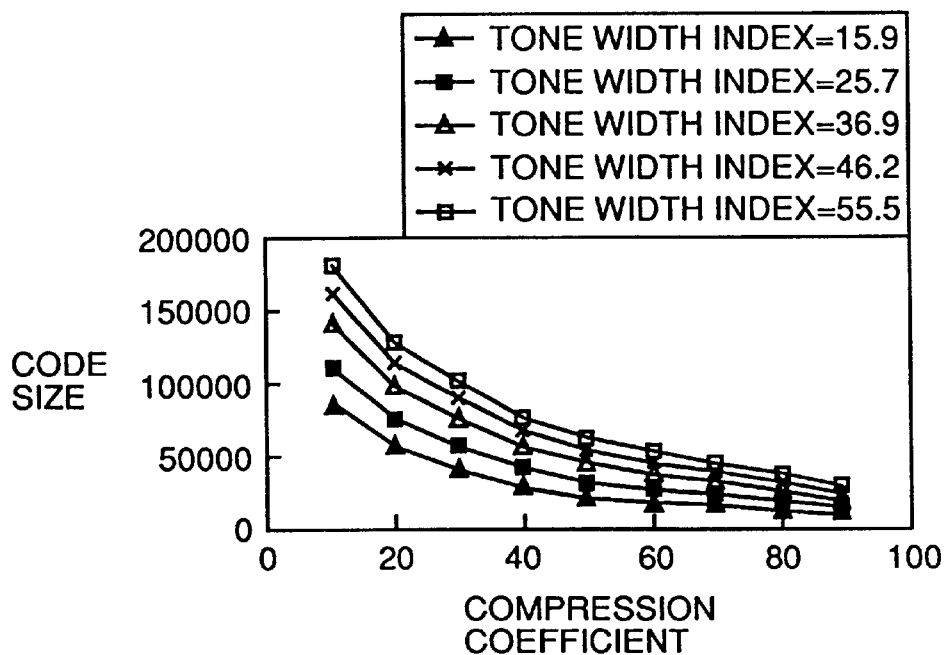
FIG. 14 is a graph related to the basic code size table of FIG. 13.

When represented in the form of a graph such as shown in FIG. 12, the table will be represented as shown in FIG. 14. As for the tone width index LD, it has already been generated at the time of FBTC coding and stored in image memory 4, and therefore the LD value can be used as it is. In compression coefficient estimating unit 31, the compression coefficient for compressing to the target code size is estimated using the input tone width index LD, and JPEG encoder 7 performs JPEG coding using the compression coefficient.

Figure 15:
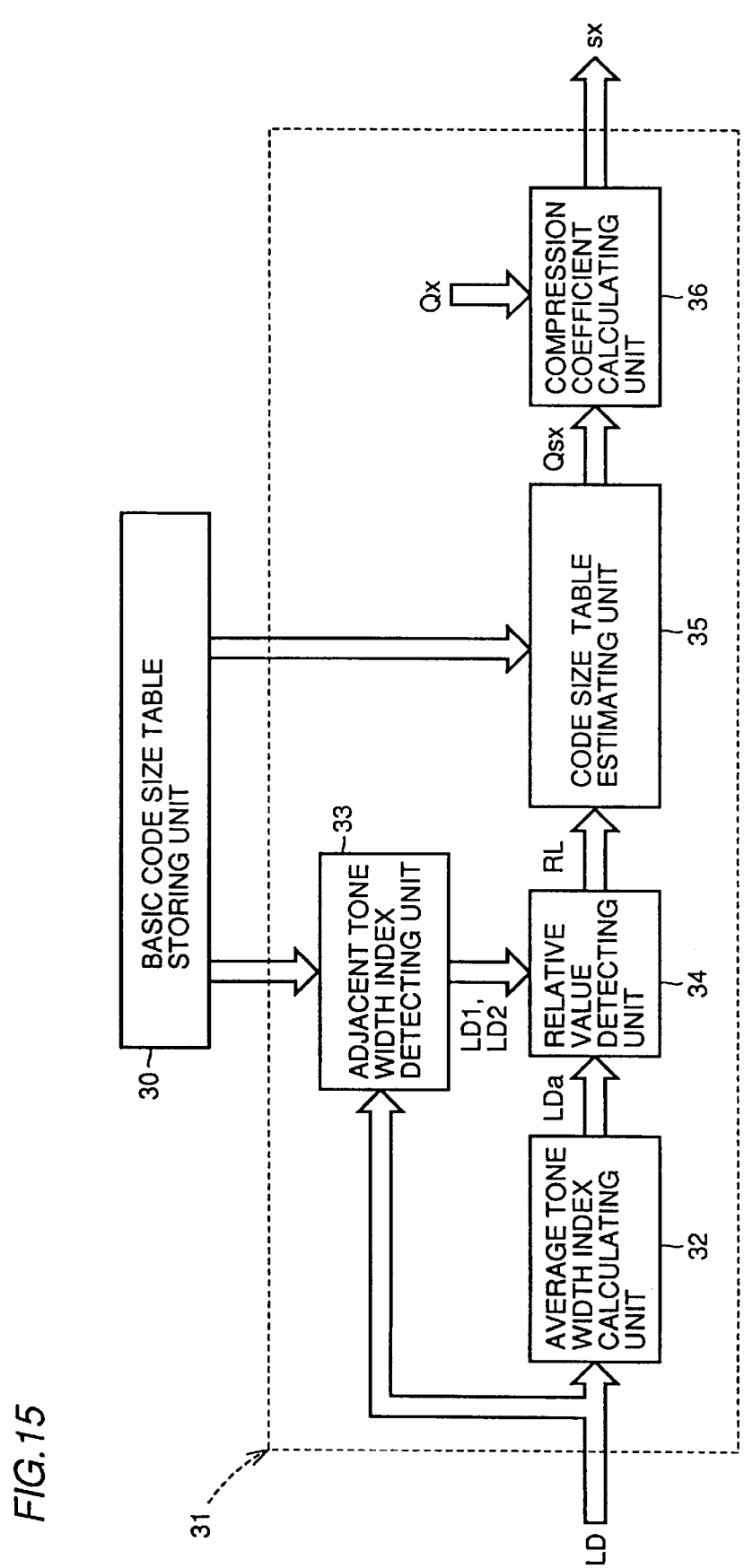
FIG. 15 is a block diagram showing a structure of a compression coefficient estimating unit shown in FIG. 11.

Compression coefficient estimating unit 31 which is the core of code size control will be described with reference to FIG. 15. Referring to FIG. 15, compression coefficient estimating unit 31 includes an average tone width index calculating unit 32, an adjacent tone width index detecting unit 33, a relative value detecting unit 34, a code size table estimating unit 35 and a compression coefficient calculating unit 36.

Average tone width index calculating unit 34 calculates, from tone width index LD which is FBTC coded data output from image memory 4, the average tone width index LDa of the entire image. Adjacent tone width index detecting unit 33 selects two tone width indexes LD1 and LD2 which are close to the average tone width index of the image which is to be presently processed (hereinafter simply referred to as object image), from a plurality of tone width indexes stored in basic code size table storing unit 30.

Relative value detecting unit 34 detects the average tone width index LDa of the object image relative to the adjacent tone width indexes LD1 and LD2. Code size table estimating unit 35 estimates relation between compression coefficient and code size of the object image (code size table). Compression coefficient calculating unit 30 calculates the compression coefficient sx for performing final JPEG coding.

The operation of compression coefficient estimating unit 31 will be described. The tone width indexes LD of respective blocks of the object image stored in image memory 4 are read successively, and average tone width index LDa of the image is calculated by average tone width index calculating unit 32.

In adjacent tone width index detecting unit 33, tone width indexes LD1 and LD2 closest to average tone width index LDa among the plurality of tone width indexes stored as indexes in basic code size table storing unit 30 (LD2>LDa>LD1) are selected.

Thereafter, in relative value detecting unit 34, a relative value RA representing how close the average tone width index LDa to the two adjacent tone width indexes LD1 and LD2 is calculated, in accordance with the following equation (19).

$$RD=(LDa-LD1)/(LD2-LD1) \qquad (19)$$

Thereafter, code size Qsx at each compression coefficient s (for example, in FIG. 13, s is from 10 to 90 incremented by 10, for example) of the object image is calculated using by code size table estimating unit 35. When code sizes of respective compression coefficients s corresponding to adjacent tone width indexes LD1 and LD2, which are indexes of basic code size table are represented by Q1s and Q2s (Q1s<Q2s), the code size Qsx at the average tone width index LDa can be estimated in accordance with the following equation (20).

$$Qsx=Q1s+(Q2s-Q1s)*RL \qquad (20)$$

Figure 16:
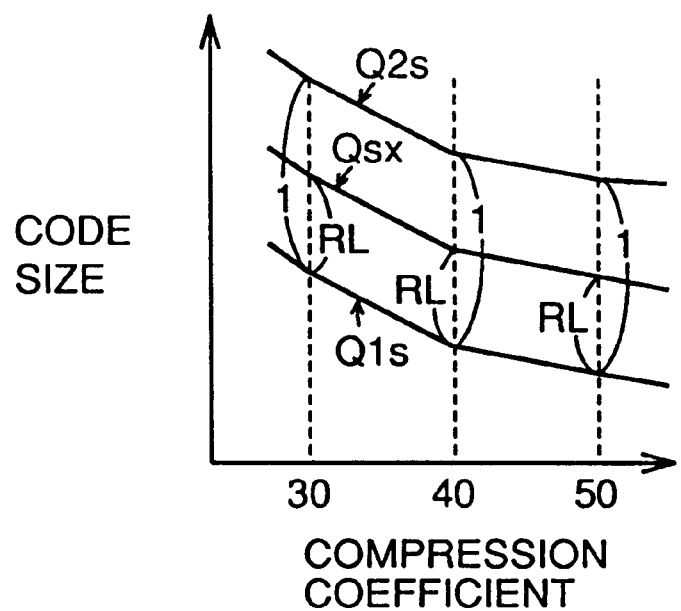
FIG. 16 is a graph related to the operation of the compression coefficient estimating unit shown in FIG. 15.

The concept of the above described processing is as shown in FIG. 16. In the example of FIG. 16, calculation is performed on compression coefficients s=30, 40 and 50. Actually, the above described processing is performed on each compression coefficient stored in basic code size table storing unit 30 (in the example of FIG. 13, s=10, 20 . . . , 90), and code size table of the object image is completed.

Figure 17:
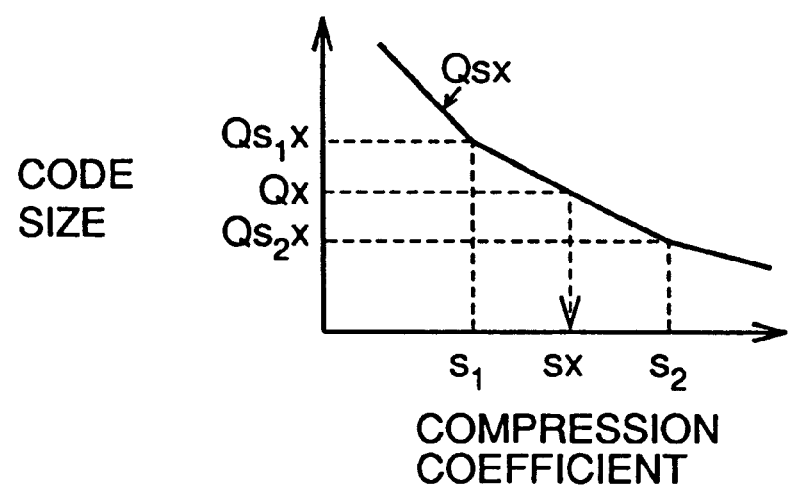
FIG. 17 is another graph related to the operation of the compression coefficient estimating unit shown in FIG. 15.

When Qsx is calculated in code size table estimating unit 35, compression coefficient sx for JPEG coding of the object image to the target code size Qx is calculated in compression coefficient calculating unit 36. More specifically, referring to FIG. 17, two code sizes $Qs_1x$ and $Qs_2x$ closest to target code size Qx are found among Qsx, and compression coefficients at that time are represented by $s_1$ and $S_2$. The optimal compression ratio sx can be calculated in accordance with the following equation (21).

$$Sx=s_2-(s_2-s_1)(Qx-Qs_2x)/(Qs_1x-Qs_2x) \qquad (21)$$

Returning to FIG. 11, when the optimal compression ratio sx is calculated in compression coefficient estimating unit 31, decoding of FBTC coded data stored in image memory starts in FBTC decoder, and image data is transferred from FBTC decoder 5 to JPEG encoder 7. In JPEG encoder 7, JPEG coding is performed using compression coefficient sx output from compression coefficient estimating unit 31 and image data output from FBTC decoder 5. The data JPEG compressed to the target code size Qx is transferred to recording apparatus 10, and stored at a prescribed address of the recording medium.

The method of preparing basic code size table to be stored in basic code size table storing unit 30 will be described. The basic code size table is prepared based on statistical values of code sizes calculated when a large number of sample images are JPEG compressed. Specific method of preparing the basic code size table will be described with respect to the flow chart of FIGS. 18 and 19.

Figure 18:
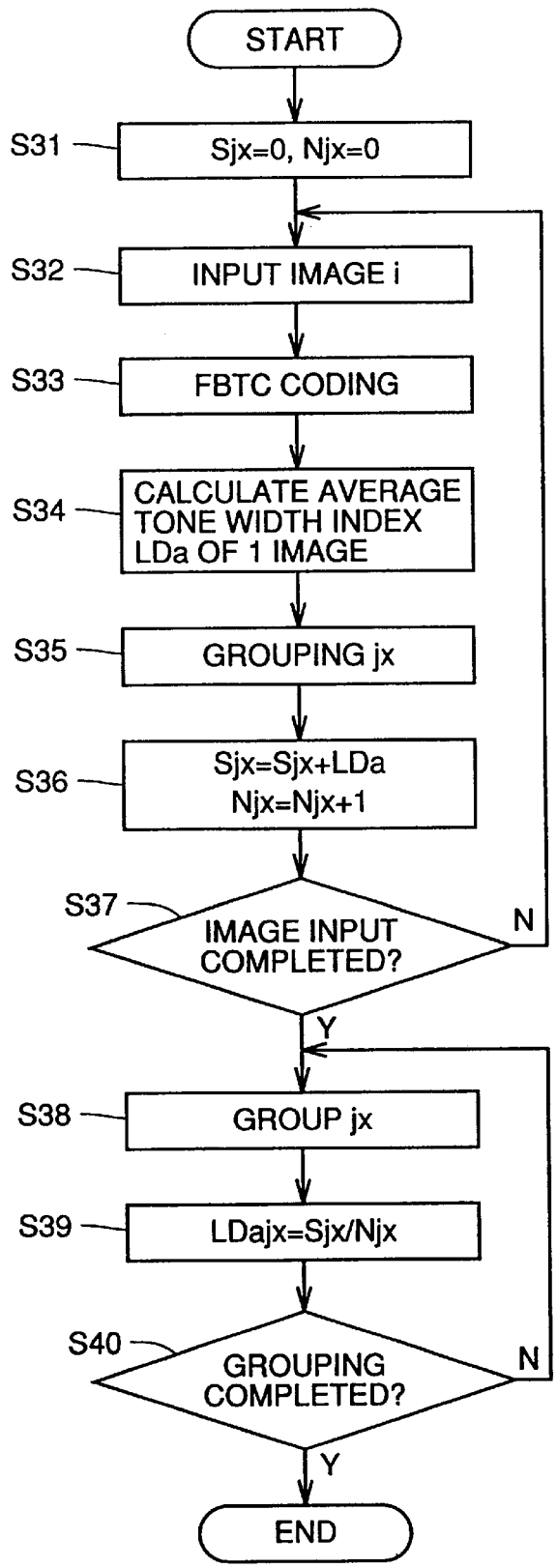
FIG. 18 is a flow chart showing the method of preparing the basic code size table stored in the basic code size table storing unit shown in FIG. 11.

First, referring to FIG. 18, FBTC coding is performed on a sample image i, and an average value LDa of tone width indexes LD of the blocks is calculated (steps S31 to S34). Thereafter, in step S35, the image which is being processed presently is divided into groups, using average value LDa. At this time, the group to which the image i belongs is represented as jx. When LDa is 0≦LDa<20, the image is classified to group jA, when LDa is 20≦LDa<30, the image is classified into group jB and if 30≦LDa<40, the image is classified into group jC, . . . and in this manner, images are divided into groups.

Thereafter, in step S36, the total sum Sjx of average tone width indexes LDa is calculated in each group, and the number of pixels Mjx belonging to each group is calculated. The above described processing (from step S32 to S36) is repeated by the number of sample images. When input of sample images is completed, average value LDajx of the average tone width indexes LDa is calculated in the group in accordance with the following equation (22), and the result is stored as the index of the basic code size, in basic code size table storing unit 30 (steps S37 to S40).

$$LDajx=Sjx/Njx \qquad (22)$$

Figure 19:
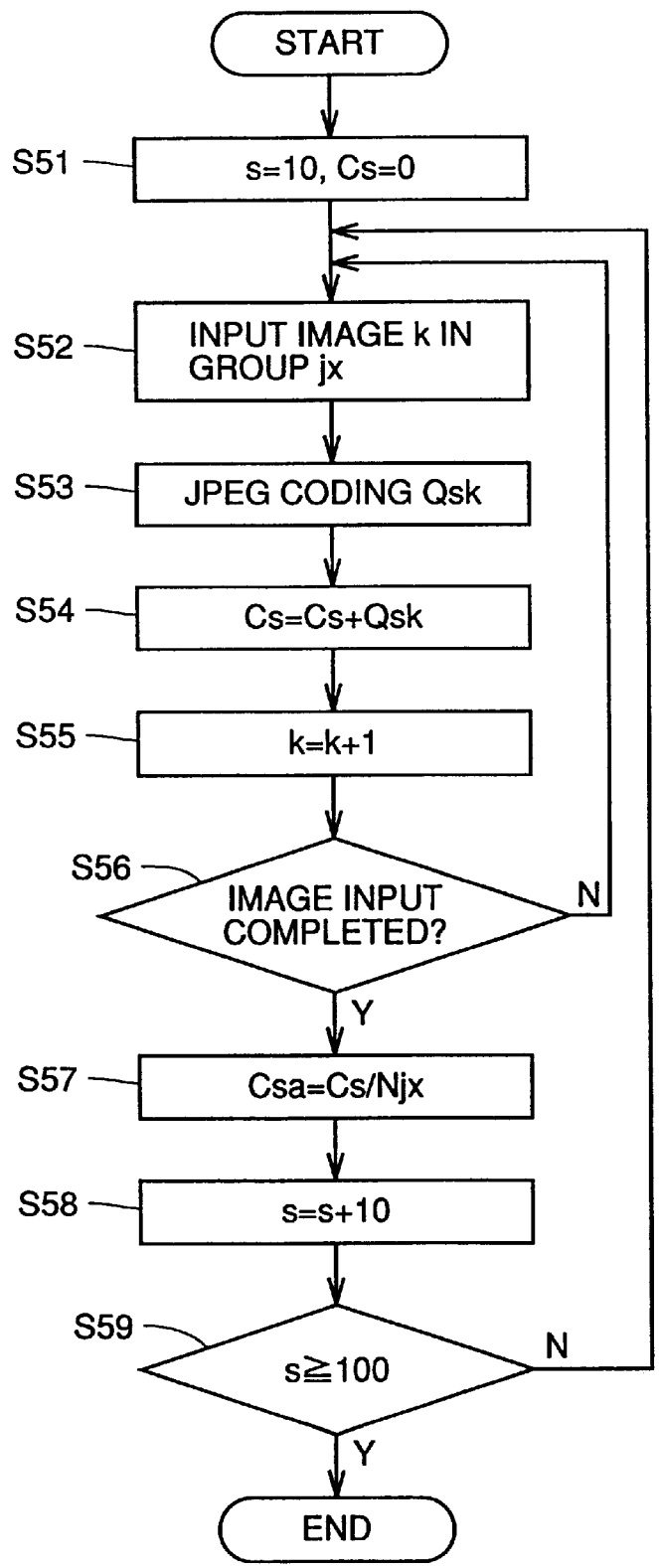
FIG. 19 is another flow chart showing the method of preparing the basic code size table stored in the basic code size table storing unit shown in FIG. 11.

Thereafter, the basic code size table for the group jx is calculated. FIG. 19 is a flow chart for each group. First, on the image k in group jx, code size when it is subjected to JPEG coding with compression coefficient s is calculated, which is represented as Qsk. Thereafter, another image (k+1) in group jx is similarly subjected to JPEG coding with compression coefficient s. The above described processing is performed on all of Njx images belonging to group jx, and total sum Cs of code sizes of the images at the compression coefficient s is calculated (steps S51 to S56).

Since the number of images belonging to group jx is Njx, the average value Csa of code size for each compression coefficient in the group is calculated in accordance with the following equation (23) (step S57), and the result is stored as data of basic code size table, in basic code size table storing unit 30. Specific image of the table is as shown in FIG. 13.

$$Csa=Cs/Nix \qquad (23)$$

When these processings are completed for one compression coefficient, similar processings are performed on another compression coefficient (steps S58, S59). In the example shown in FIG. 19, compression coefficients are from 10 to 90 incremented by 10. However, numerical values are not limited thereto.

The basic code size table is merely statistical data for controlling code size. When the code size is to be actually controlled, the basic code size table is stored in a memory (basic code size table storing unit 30) such as a ROM or an RAM, and the table is used modified in accordance with the average tone width index LDa of the object image.

In this embodiment, when the code size is to be controlled so that it is kept constant at the time of JPEG coding, the compression coefficient sx as the control parameter is estimated based on the basic code size table and average tone width index LDa of each image. Therefore, only one JPEG coding is required. Therefore, compared with the prior art in which JPEG coding of which amount of calculation is huge is performed three times, the necessary process time can be significantly reduced.

Further, since FBTC coding is performed in the preceding stage of JPEG coding, image memory 4 requires only a small capacity.

In the present embodiment, compression ratio of FBTC coding is ½. However, the compression ratio can be controlled by changing quantization bit width of each pixel value. Therefore, the capacity of the image memory 4 can be adjusted accordingly.

[Fifth Embodiment]

Figure 20:
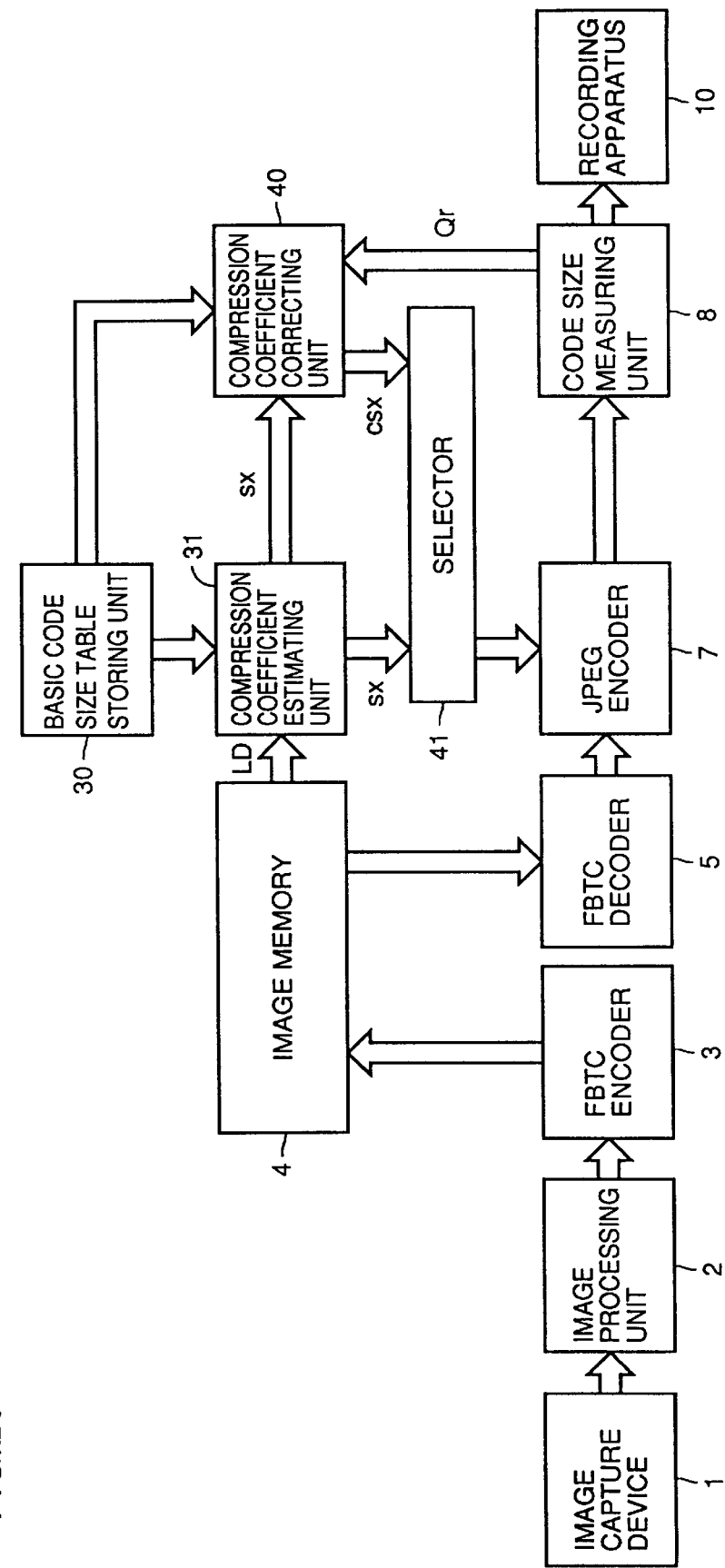
FIG. 20 is a block diagram showing a structure of an electronic still camera in accordance with a fifth embodiment of the present invention.

FIG. 20 is a block diagram showing the structure of the electronic still camera in accordance with the fifth embodiment of the present invention. Referring to FIG. 20, the electronic still cameral differs from the electronic still camera of FIG. 11 in that a code size measuring unit 8, a compression coefficient correcting unit 40 and a selector 41 are newly provided.

Code size measuring unit 8 is the same as that shown in FIG. 1, and it measures the code size Qr when the first JPEG coding is performed. Compression coefficient correcting unit 40 corrects compression coefficient sx generated by compression coefficient estimating unit 31 and newly estimates a compression coefficient csx. Selector 41 selects, as the compression coefficient to be used by JPEG encoder 7, either the compression coefficient sx generated by compression coefficient estimating unit 31 or the compression coefficient csx generated by compression coefficient correcting unit 40.

The operation of the electronic still camera will be described in the following. Referring to FIG. 20, components from image capture device 1, JPEG encoder 7, basic code size table storing unit 30 and compression coefficient estimating unit 31 operate in the same manner as in the fourth embodiment. More specifically, image data decoded by FBTC decoder 5 is applied to JPEG encoder 7, and the compression coefficient sx estimated by compression coefficient estimating unit 31 is applied through selector 41 to JPEG encoder 7, and the first JPEG coding is performed in JPEG encoder 7. The code size when the first JPEG coding is performed is represented as Qr. In compression coefficient correcting unit 40, code size table Qsx is corrected in accordance with the following equation (24).

$$Qscx = Qsx + (Qr - Qx) \quad (24)$$

Here, Qcsx represents code size after correction at each compression coefficient s, which will be hereinafter referred to as corrected code size table. Using Qcsx, the corrected compression coefficient csx is calculated in accordance with the following equation (25), based on the same concept as represented by the equation (21).

$$csx = cs_2 - (cs_2 - cs_1)(Qx - Qsc_2x)/(Qsc_1x - Qsc_2x) \quad (25)$$

Figure 21:
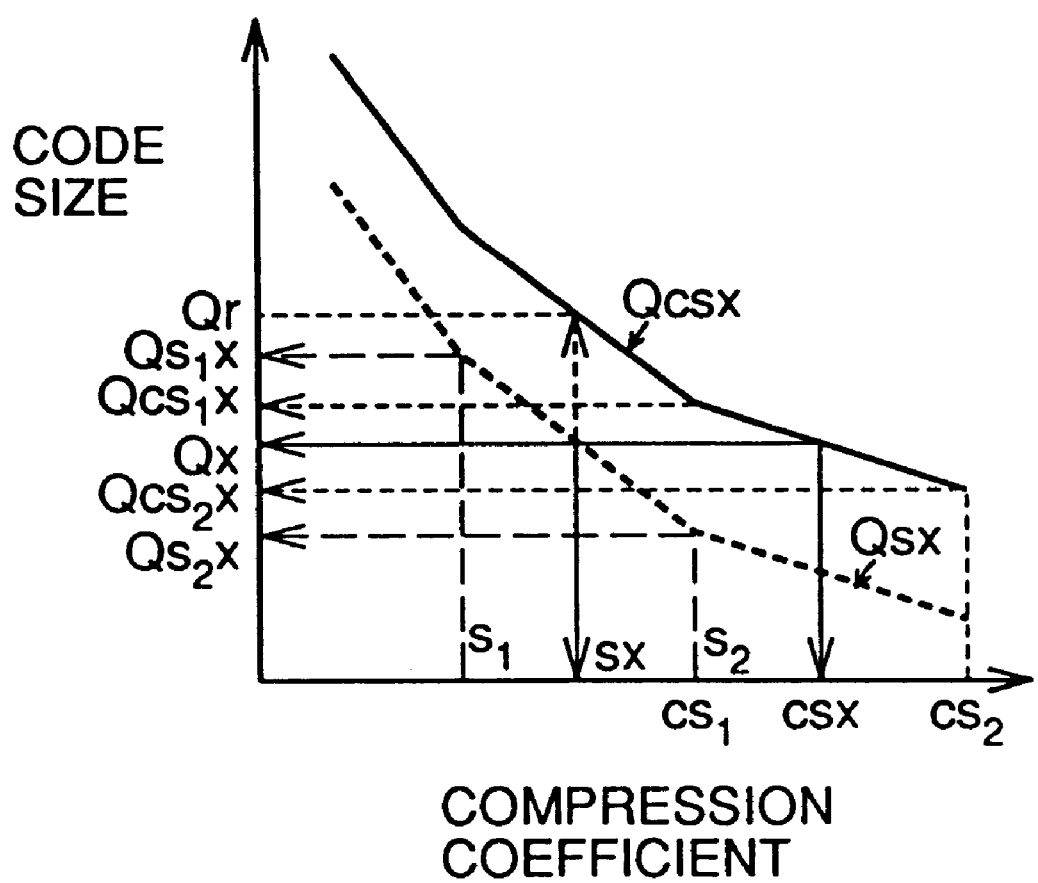
FIG. 21 is a graph related to the operation of the compression coefficient correcting unit shown in FIG. 20.

Here, $Qcs_1x$ and $Qcs_2x$ represent two code sizes ($Qcs_2x < Qcs_1x$) closest to Qx among Qcsx, and $cs_1$ and $cs_2$ ($cs_1 < cs_2$) represent respective compression coefficients. The above described processing is graphically represented as shown in FIG. 21.

The corrected compression coefficient csx generated by compression coefficient correcting unit 40 is applied to JPEG encoder 7 through selector 41. JPEG encoder 7 performs the second JPEG coding using the corrected compression coefficient csx. The data JPEG compressed to the target code size Qx by the second JPEG coding is transferred to recording apparatus 10, and stored at a prescribed address of the recording medium.

In the present embodiment, the compression coefficient sx used in the first JPEG coding is corrected such that the code size after compression comes closer to the target code size Qx, referring to the code size Qr of the data obtained by the JPEG compression. Therefore, more precise code size control is realized.

In the fifth embodiment, as in the fourth embodiment, FBTC coding is utilized, and therefore capacity of image memory 4 can be reduced. While JPEG coding requiring huge amount of calculation is performed three times in the conventional example, highly precise code size control is possible by only two JPEG coding operations in accordance with the fifth embodiment.

[Sixth Embodiment]

Figure 22:
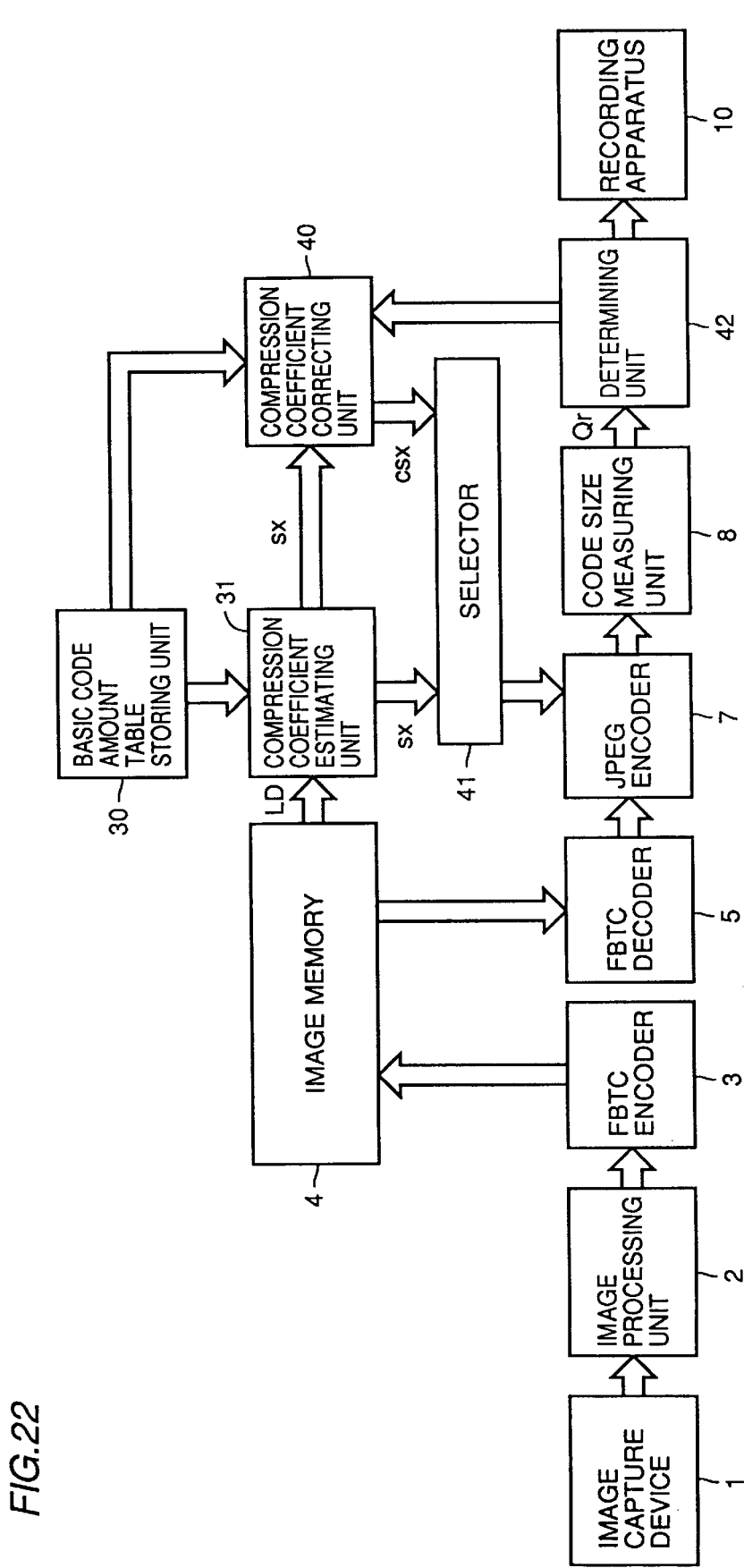
FIG. 22 is a block diagram showing a structure of an electronic still camera in accordance with a sixth embodiment of the present invention.

FIG. 22 is a block diagram showing the structure of the electronic still camera in accordance with a sixth embodiment of the present invention. The electronic still camera differs from the one shown in FIG. 20 in that a determining unit 40 is newly provided.

In the sixth embodiment, the following operation is added to the operation of the fifth embodiment. More specifically, a certain reference value T3 is set, the result of measurement by code size measuring unit 8 is represented as Qr and target code size is represented as Qx, and determination is performed by the determining unit 42 in accordance with the following determining method 1.

(Determining Method 1)

When Qr<Qx−T3 or Qx+T3<Qr, compression coefficient sx is corrected in the similar manner as in the fifth embodiment, and the second JPEG coding is performed using the corrected compressing coefficient csx.

Otherwise, the compressed data is directly transferred to recording apparatus 10, as in the fourth embodiment.

By this processing, it becomes possible to have the code size within the range of Qx±T3 without fail, and therefore controllability is improved. By using the following determining method 2, it is possible to have the code size below the target code size Qx without fail. Therefore, overflow of storing capacity of the recording apparatus 10 of the electronic still camera can be prevented.

(Determining Method 2)

When Qr>Qx, compression coefficient sx is corrected in the similar manner as in the fifth embodiment, and JPEG coding is performed again using the corrected compression coefficient csx.

Otherwise, the compressed data is directly transferred to the recording apparatus 10, as in the fourth embodiment.

In the present embodiment, whether only one JPEG coding is to be performed or whether JPEG coding is to be performed twice with the compression coefficient sx corrected, is determined based on the code size Qr of the data resulting from the first JPEG coding. Therefore, it becomes possible to encode and compress the data to the target code size Qx in accordance with the method of determination by determining unit 42.

In the prior art example, JPEG coding which requires huge amount of calculation is performed three times, coding control is possible with the accuracy or precision corresponding to the determine method, by performing only one or two JPEG coding operations.

Though the present invention has been applied to the electronic still camera in the embodiments described above, the application of the present invention is not limited thereto. The present invention is applicable to any apparatus including an image coding device for compressing image information and converting it to variable length code of a predetermined code size. For example, it is applicable to an image storing/transmitting device for storing/transmitting the generated variable length code. The image storing/transmitting device may include a scanner for reading and storing images, a digital copying machine including such scanner, and an image/video image wireless communication apparatus such as a portable TV phone for performing wireless communication of images/video images.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image coding apparatus for compressing image information and converting it to variable length code of a predetermined code size, comprising:

fixed length coding means for compressing and converting to fixed length code said image information;

an image memory for storing the fixed length code generated by said fixed length coding means;

compression coefficient estimating means for estimating, based on the fixed length code read from said image memory, a compression coefficient for compressing said image information to a variable length code of a predetermined code size;

decoding means for decoding the fixed length code read from said image memory to said image information; and variable length coding means for compressing image information decoded by said decoding means with the compression coefficient estimated by said compression coefficient estimating means, and converting it to the variable length code of said predetermined code size.

2. The image coding apparatus according to claim 1, wherein said compression coefficient estimating means includes first preencoding means for compressing the fixed length code read from said image memory with a first precompression coefficient for converting it to a variable length code, second preencoding means for compressing the fixed length code read from said image memory with a second recompression coefficient different from said first precompression coefficient, measuring means for measuring code sizes of variable length codes generated by said first and second preencoding means, and compression coefficient calculating means for calculating said compression coefficient based on said fist and second precompression coefficients and result of measurement by said measuring means.

3. The image coding apparatus according to claim 2, wherein said image information includes pixel data of one frame;

said fixed length coding means divides said image information into a plurality of pixel blocks each including M×N pixel data, generates a mean value of the pixel data, a tone width index of the pixel data and M×N quantization values for each pixel block, for converting said image information to said fixed length code; and each of said first and second preencoding means compresses only the mean value of said image data of the fixed length code read from said image memory.

4. The image coding apparatus according to claim 3, wherein said compression coefficient estimating means further includes correcting means for correcting the result of measurement by said measuring means based on at least one of said quantization value and said tone width index of said pixel data of the fixed length code read from said image memory, and said compression coefficient calculating means calculates said compression coefficient based on the result of measurement by said measuring means corrected by said correcting means.

5. The image coding apparatus according to claim 2, wherein said image information includes pixel data of one frame;

said fixed length coding means divides said image information into a plurality of pixel blocks each containing M×N pixel data, generates a mean value of the pixel data, a tone width index of the pixel data and M×N quantization values for each pixel block, for converting said image information to said fixed length code; and each of said first and second preencoding means compresses only the tone width index of said pixel data of the fixed length code read from said image memory.

6. The image coding apparatus according to claim 5, wherein said compression coefficient estimating means further includes correcting means for correcting the result of measurement by said measuring means based on at least one of said quantization value and the mean value of said pixel data of the fixed length code read from said image memory, and said compression coefficient calculating means calculates said compression coefficient based on the result of measurement by said measuring means corrected by said correcting means.

7. The image coding apparatus according to claim 1, wherein said compression coefficient estimating means includes basic code size table storing means for storing a plurality of typical relations between compression coefficient and code size, in association with fixed length code data generated by said fixed length coding means, and compression coefficient calculating means for calculating said compression coefficient based on said plurality of relations between compression coefficient and code size read from said basic code size table storing means and the fixed length code data read from said image memory.

8. The image coding apparatus according to claim 7, wherein said image information includes pixel data of one frame;

said fixed length coding means divides said image information into a plurality of pixel blocks each including M×N pixel data, generates an average value of pixel data, a tone width index of pixel data and M×N quantization values for each pixel block, for converting said image information to said fixed length code; and said basic code size table storing means stores, using tone width index which is fixed length code data obtained when each of a plurality of sample images are coded by said fixed length coding means, and using relation between compression coefficient and code size when coding is performed by using said variable length coding means, relation between compression coefficient and code size for a plurality of typical tone width indexes.

9. The image coding apparatus according to claim 8, wherein said compression coefficient estimating means further includes average tone width index calculating means for calculating an average value of a plurality of tone width indexes read from said image memory, adjacent tone width index detecting means for detecting two tone width indexes closest to the average tone width index generated by said average tone width index calculating means, among a plurality of tone width indexes stored in said basic code size table storing means, relative value detecting means for detecting a relative value indicating how close the average tone width index calculated by said average tone width index calculating mean is relative to the two adjacent tone width indexes detected by said adjacent tone width index detecting means, and code size table estimating means for estimating relation between compression coefficient and code size of an image to be processed presently, based on said relative value and relation between the compression coefficient and code size stored in said basic code size table storing means; and said compression coefficient calculating means calculates said compression coefficient using, instead of the relation between the compression coefficient and the variable length code size read from said basic code size table storing means, the relation between the compression coefficient and a code size estimated by said code size table estimating means.

10. The image coding apparatus according to claim 7, wherein said compression coefficient estimating means further includes predecoding means for decoding the fixed length code read from said image memory to image information, preencoding means for compressing the image information generated by said predecoding means with the compression coefficient calculated by said compression coefficient calculating means, and converting it to variable length code, measuring means for measuring code size of the variable length code generated by said preencoding means, and correcting means for correcting the compression coefficient generated by said compression coefficient calculating means, based on the code size measured by said measuring means; and said variable length coding means compresses said image information with the compression coefficient corrected by said correcting means.

11. The image coding apparatus according to claim 10, wherein said correcting mean corrects the relation between the compression coefficient and a code size based on the difference between the code size measured by said measuring means and said predetermined code size, and estimates the compression coefficient again referring to the corrected relation.

12. The image coding apparatus according to claim 10, wherein said compression coefficient estimating means further includes determining means for determining whether the compression coefficient calculated by said compression coefficient calculating mean needs correction or not, based on the result of measurement by said measuring means; and said correcting means corrects, only when it is determined by said determining means that correction is necessary, the compression coefficient calculated by said compression coefficient calculating means, and the variable length code generated by said preencoding means is output instead of the variable length code generated by said variable length coding means when it is determined by said determining means that correction is not necessary.

13. The image coding apparatus according to claim 12, wherein said determining means determines correction of the compression coefficient calculated by said compression coefficient calculating means is not necessary when the code size measured by said measuring means is within a prescribed tolerable range of said predetermined code size.

14. The image coding apparatus according to claim 12, wherein said determining means determines that correction of the compression coefficient calculated by said compression coefficient calculating means is not necessary when the code size measured by said measuring means is not larger than said predetermined code size.

15. The image coding apparatus according to claim 1, wherein said fixed length coding means compresses said image information and converts to fixed length code including data representative of tone width.

16. A method of coding an image by compressing image information and converting it to variable length code of a predetermined code size, comprising:

the first step of compressing and converting to a fixed length code said image information;

the second step of storing the fixed length code generated in said first step in an image memory;

the third step of estimating a compression coefficient for compressing said image information to a variable length code of said predetermined code size, based on the fixed length code read from said image memory;

the fourth step of decoding the fixed length code read from said image memory to said image information; and the fifth step of converting the image information decoded in said fourth step by compressing it with the compression coefficient estimated in said third step, for converting it to the variable length code of said predetermined code size.

17. The method of image coding according to claim 15, wherein said first step includes the step of compressing said image information and converting to fixed length code including data representative of tone width.

18. An image storing/transmitting apparatus for compressing and converting image information to variable length code of a predetermined code size, and for storing/transmitting said variable length code, comprising:

fixed length coding means for compressing and converting to fixed length code said image information;

an image memory for storing the fixed length code generated by said fixed length coding means;

compression coefficient estimating means for compressing said image information to the variable length code of said predetermined code size, based on the fixed length code read from said image memory; and decoding means for decoding the fixed length code read from said image memory to said image information; and variable length coding means for compressing and converting to the variable length code of said predetermined code size, the image information decoded by said decoding means with the compression coefficient estimated by said compression coefficient estimating means.

19. An image storing/transmitting apparatus according to claim 16, wherein said fixed length coding means compresses said image information and converts to fixed length code including data representative of tone width.

* * * * *